United States Patent
Kanemura

(10) Patent No.: US 7,874,009 B2
(45) Date of Patent: Jan. 18, 2011

(54) DATA PROCESSING DEVICE

(75) Inventor: Kouichi Kanemura, Osaka (JP)

(73) Assignee: Panasonic Corporation, Osaka (JP)

( * ) Notice: Subject to any disclaimer, the term of this patent is extended or adjusted under 35 U.S.C. 154(b) by 645 days.

(21) Appl. No.: 11/914,525

(22) PCT Filed: May 26, 2006

(86) PCT No.: PCT/JP2006/310584

§ 371 (c)(1), (2), (4) Date: Nov. 15, 2007

(87) PCT Pub. No.: WO2006/126686

PCT Pub. Date: Nov. 30, 2006

(65) Prior Publication Data

US 2009/0083520 A1  Mar. 26, 2009

(30) Foreign Application Priority Data

May 26, 2005 (JP) .............................. 2005-153478

(51) Int. Cl.
*G06F 12/14* (2006.01)
(52) U.S. Cl. ..................... 726/27; 711/164; 726/28; 726/29
(58) Field of Classification Search ............. 711/164; 713/193; 726/26, 27, 28, 29
See application file for complete search history.

(56) References Cited

U.S. PATENT DOCUMENTS

| | | | |
|---|---|---|---|
| 6,973,015 B1 * | 12/2005 | Murakami et al. | 369/47.21 |
| 6,983,374 B2 | 1/2006 | Hashimoto et al. | |
| 7,035,850 B2 | 4/2006 | Arai et al. | |
| 7,096,268 B1 * | 8/2006 | Shoda et al. | 709/229 |
| 7,117,284 B2 | 10/2006 | Watt et al. | |

(Continued)

FOREIGN PATENT DOCUMENTS

JP    2-155034    6/1990

(Continued)

OTHER PUBLICATIONS

International Search Report issued Aug. 15, 2006 in the International (PCT) Application of which the present application is the U.S. National Stage.

(Continued)

*Primary Examiner*—William M Treat
(74) *Attorney, Agent, or Firm*—Wenderoth, Lind & Ponack, L.L.P.

(57) ABSTRACT

Provided is a data processing device that can prevent data used by a program from being used by another program in an unauthorized manner, regardless of the quality of the programs. The data processing device includes: a CPU 0201 for executing programs; and an unauthorized operation prevention circuit 0105 that prevents unauthorized accesses to data between programs. An unauthorized operation prevention control unit 0106, which operates in the protected mode and controls the circuit 0105, judges whether or not to permit a program B 0103 that runs in the normal mode to use a memory area that is used by a program A 0102 that runs in the normal mode, based on a function flag assigned to the program B 0103. If it judges to permit, the circuit 0105 is set so that the program B 0103 can use the memory area.

14 Claims, 23 Drawing Sheets

U.S. PATENT DOCUMENTS

| | | |
|---|---|---|
| 7,120,771 B2 | 10/2006 | Dahan et al. |
| 7,124,274 B2 | 10/2006 | Watt et al. |
| 7,149,862 B2 | 12/2006 | Tune et al. |
| 7,171,539 B2 | 1/2007 | Mansell et al. |
| 7,185,159 B2 | 2/2007 | Beinet et al. |
| 2001/0014157 A1 | 8/2001 | Hashimoto et al. |
| 2001/0018736 A1 | 8/2001 | Hashimoto et al. |
| 2001/0025311 A1 | 9/2001 | Arai et al. |
| 2003/0126458 A1 | 7/2003 | Teramoto et al. |
| 2003/0140205 A1 | 7/2003 | Dahan et al. |
| 2003/0140244 A1 | 7/2003 | Dahan et al. |
| 2003/0140245 A1 | 7/2003 | Dahan et al. |
| 2004/0105298 A1 | 6/2004 | Symes |
| 2004/0123118 A1 | 6/2004 | Dahan et al. |
| 2004/0139346 A1 | 7/2004 | Watt et al. |
| 2004/0143714 A1 | 7/2004 | Watt |
| 2004/0143720 A1 | 7/2004 | Mansell et al. |
| 2004/0148480 A1 | 7/2004 | Watt et al. |
| 2004/0153593 A1 | 8/2004 | Watt et al. |
| 2004/0153672 A1 | 8/2004 | Watt et al. |
| 2004/0153807 A1 | 8/2004 | Watt et al. |
| 2004/0158727 A1 | 8/2004 | Watt et al. |
| 2004/0158736 A1 | 8/2004 | Watt et al. |
| 2004/0163013 A1 | 8/2004 | Watt et al. |
| 2004/0170046 A1 | 9/2004 | Belnet et al. |
| 2004/0177261 A1 | 9/2004 | Watt et al. |
| 2004/0177269 A1 | 9/2004 | Belnet et al. |
| 2004/0181682 A1 | 9/2004 | Orino et al. |
| 2004/0187117 A1 | 9/2004 | Orion et al. |
| 2004/0260910 A1 | 12/2004 | Watt et al. |
| 2005/0114616 A1 | 5/2005 | Tune et al. |
| 2005/0160210 A1 | 7/2005 | Watt et al. |
| 2005/0166069 A1 | 7/2005 | Hashimoto et al. |

FOREIGN PATENT DOCUMENTS

| | | |
|---|---|---|
| JP | 4-102920 | 4/1992 |
| JP | 2001-318787 | 11/2001 |
| JP | 2001-337864 | 12/2001 |
| JP | 2002-202720 | 7/2002 |
| JP | 2004-199693 | 7/2004 |
| JP | 2004-288155 | 10/2004 |

OTHER PUBLICATIONS

Thekkath et al., "Architectural Support for Copy and Tamper Resistant Software", *Computer Systems Laboratory*, 2000.

Suh et al., "The AEGIS Processor Architecture for Tamper-Evident and Tamper-Resistant Processing", *MIT Laboratory for Computer Science*.

\* cited by examiner

FIG. 9

Management table — 0110

Security requirement management information table — T0310

| Security requirement management information identifier | Data address | Generator program identifier | Sharing program identifier | Security requirement |
|---|---|---|---|---|
| 1 | XXX~YYY | P1 | P2, P3 | SR1 |
| 2 | YYY~ZZZ | P1 | P1, P3 | SR2 |
| 3 | ZZZ~FFF | P1 | P1, P2 | SR3 |
| 4 | AAA~BBB | P2 | P1, P2 | SR4 |
| ... | ... | ... | ... | ... |

T0311, T0312, T0313, T0314

Program management information table — T0410

| Program management information identifier | Code address | Program identifier | Sharing program identifier | Function flag |
|---|---|---|---|---|
| 1 | XXX~YYY | P1 | P2, P3 | F1 |
| 2 | YYY~ZZZ | P1 | P1, P3 | F2 |
| 3 | ZZZ~FFF | P1 | P1, P2 | F3 |
| 4 | AAA~BBB | P2 | P1, P2 | F4 |
| ... | ... | ... | ... | ... |

T0411, T0412, T0413, T0414

Current program management table — T0503

| P1 |
|---|

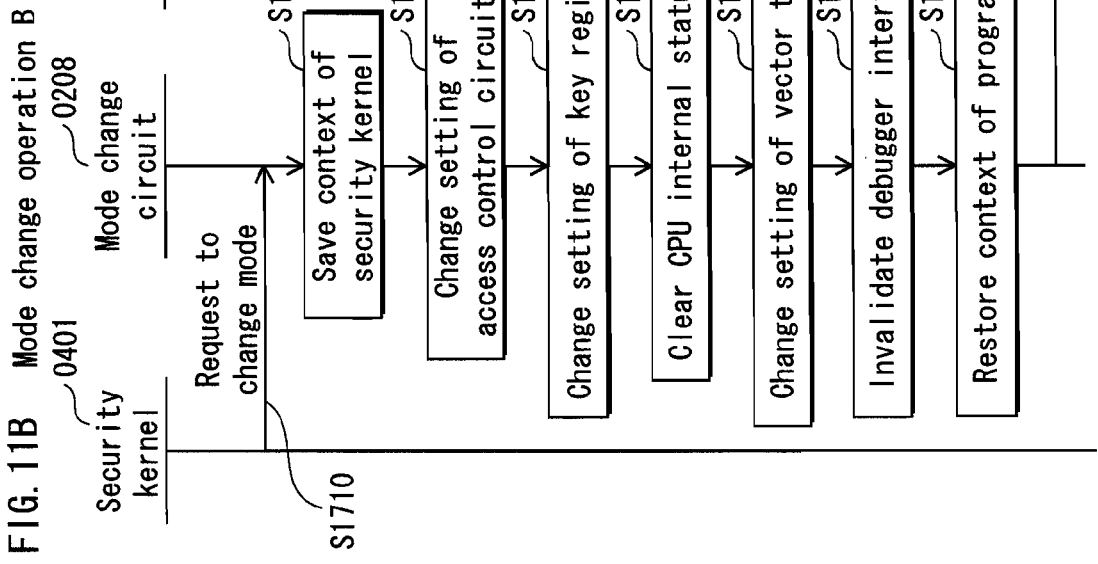
FIG. 11B Mode change operation B
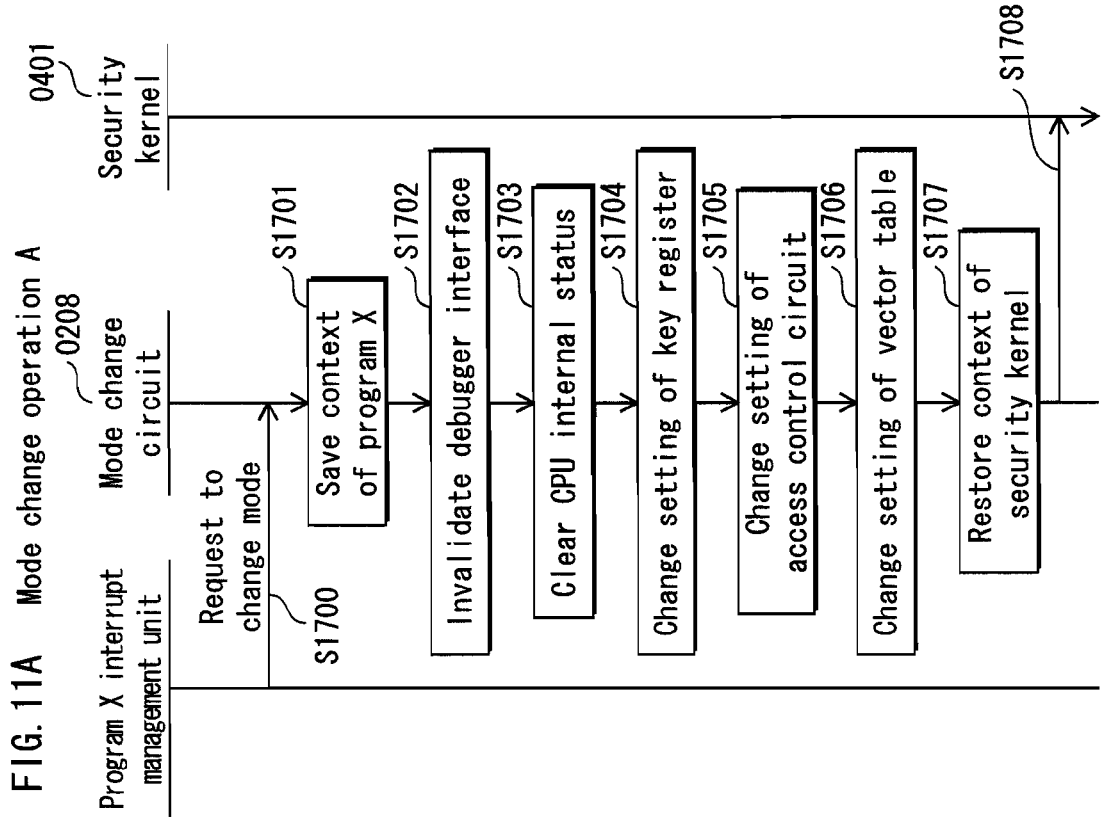
FIG. 11A Mode change operation A

FIG. 17

Program A data area management information table (T0500)

| Data area identifier | Data address | Data encryption key |
|---|---|---|
| A_D0 | 1500~1599 | KD_A1 |
| A_D1 | 8000~8999 | KD_S |
| A_D2 | 1600~1699 | KD_A2 |
| Undefined area | Other than defined area | KD_RA |

T0501, T0502, T0503

Program A code area management information table (T0900)

| Code area identifier | Code address | Code encryption key |
|---|---|---|
| A_C0 | 1000~1099 | KC_A |
| Undefined area | Other than defined area | KC_RA |

T0901, T0902

Program B data area management information table (T0600)

| Data area identifier | Data address | Data encryption key |
|---|---|---|
| B_D0 | 2500~2599 | KD_B1 |
| B_D1 | 1600~1699 | KD_A2 |
| Undefined area | Other than defined area | KD_RB |

T0601, T0602

Program B code area management information table (T1000)

| Code area identifier | Code address | Code encryption key |
|---|---|---|
| B_C0 | 2000~2099 | KC_R3 |
| Undefined area | Other than defined area | KC_RB |

Program C data area management information table (T0700)

| Data area identifier | Data address | Data encryption key | |
|---|---|---|---|
| C_D0 | 3500~3599 | KD_C1 | ← T0701 |
| Undefined area | Other than defined area | KD_RB | |

Program C code area management information table (T1100)

| Code area identifier | Code address | Code encryption key | |
|---|---|---|---|
| A_C0 | 1000~1099 | KC_A | ← T0901 |
| Undefined area | Other than defined area | KC_RA | ← T0902 |

OS data area management information table (T0800)

| Data area identifier | Data address | Data encryption key |
|---|---|---|
| OS_D0 | 4500~4599 | KD_OS1 |
| Undefined area | Other than defined area | KD_ROS |

OS code area management information table (T1200)

| Code area identifier | Code address | Code encryption key | |
|---|---|---|---|
| OS_C0 | 4000~4099 | KC_R7 | ← T1201 |
| Undefined area | Other than defined area | KC_RB | ← T1202 |

FIG. 19

Program management information table T1300

| Program management information identifier | Code address | Program identifier | Sharing program identifier | Function flag |
|---|---|---|---|---|
| C1 | 1000~1099 | A | — | No file output function |
| C2 | 2000~2099 | B | — | No file output function |
| C3 | 3000~3099 | C | — | Having file output function |
| C4 | 4000~4099 | OS | — | Having file output function |

T1301 T1302 T1303 T1304

Security requirement management information table T1400

| Security requirement management information identifier | Data address | Generator program identifier | Sharing program identifier | Security requirement |
|---|---|---|---|---|
| D1 | 1500~1599 | A | — | Access available only to program A |
| D2 | 8000~8999 | A | — | File output not available |
| D3 | 1600~1699 | A | B | File output not available |
| D4 | 2500~2599 | B | — | Access available only to program B |
| D5 | 3500~3599 | C | — | Access available only to program C |
| D6 | 4500~4599 | OS | — | Access available only to OS |

T1401 T1402 T1403 T1404 T1405

DATA PROCESSING DEVICE

TECHNICAL FIELD

The present invention relates to a data processing device for processing protected data by running a plurality of processes to operate in cooperation with each other, and especially to a technology for preventing protected data from being processed in an unauthorized manner.

BACKGROUND ART

In recent years, many digital home-electric appliances, such as content playback devices for playing back music contents, movie contents or the like, are implemented with functions to encrypt and decrypt data for copyright protection (see Patent Documents 1-2) or are implemented with program update functions to, after sales, add new functions or correct bugs.

Patent Document 1: Japanese Patent Application Publication No. 2-155034

Patent Document 2: Japanese Patent Application Publication No. 4-102920

Patent Document 3: Japanese Patent Application Publication No. 2001-318787

Non-Patent Document 1: Lei, D., Thekkath, C. A., Mitchell, M., Lincoln, P., Boneh, D., Mitchell, J. C. and Horowitz, M.: *Architechtural Support for Copy and Tamper Resistant Software, In Proceedings of the 9th Inte'l Conference on Architectural Support for Programming Languages and Operating Systems (ASPLOS-IX)*, pages 169-177, November 2000.

Non-Patent Document 2: E. Suh, D. Clarke, B. Gassend, M. van Dijk, and S. Devadas. *The AEGIS processor architecture for tamper evident and tamper resistant processing*. Technical Report LCS-TM461, Massachusetts Institute of Technology, February 2003.

DISCLOSURE OF THE INVENTION

The Problems the Invention is Going to Solve

In the techniques described above, processes performed onto data, such as the encryption or decryption, are performed under control of an authorized program, so the data is not leaked by another program.

However, when (a) a decryption program for decrypting encrypted data and (b) a player program for playing back the decrypted data process data in cooperation with each other, an arrangement for the data to be used by a plurality of programs is required. A problem in such a case is that, if the aforesaid program update function is abused to introduce an unauthorized program, the aforesaid data may be leaked to outside by the unauthorized program.

It is therefore an object of the present invention to provide a data processing device that can prevent data from being leaked to outside even if a plurality of programs process the data in cooperation with each other.

Means to Solve the Problems

The above-stated object is fulfilled by a data processing device which has a processor that operates in accordance with a program, and operates with switching operation mode between a normal mode and a protected mode, wherein, in the normal mode, a process being a unit of execution of the program runs, and in the protected mode, the process is restricted from running, the data processing device comprising: an access prohibit unit operable to, in the normal mode, permit a first process to access process-target data of the first process, and prohibit another process from accessing the process-target data of the first process; a detection unit operable to, in the normal mode, detect a call instruction from the first process to a second process; a switch unit operable to, if the detection unit detects the call instruction, switch the operation mode from the normal mode to the protected mode; a judgment unit operable to, in the protected mode, judge whether or not the second process is authorized to use the process-target data of the first process; and a control unit operable to control the access prohibit unit to permit the second process to access the process-target data of the first process in the normal mode, when the judgment unit, in the protected mode, judges that the second process is authorized to use the process-target data of the first process.

EFFECTS OF THE INVENTION

With the above-stated structure, in the data processing device of the present invention, the first process can transfer data to the second process such that the data transfer is not known to processes other than the second process. This prevents the data from being leaked to outside by other processes that operate in the normal mode.

Further, with the above-stated structure, even if the second program is updated with respect to its function such that it loses the authority to use the process target data of the first process, the judgment unit detects it and the control unit can prevent leakage of the information.

In the above-described data processing device, the access prohibit unit may include: a memory; a holding sub-unit holding management information such that the management information can be rewritten only in the protected mode, the management information indicating, for each process, an area in the memory that is permitted to be accessed; and an access restriction sub-unit operable to cause a process, which runs in the normal mode, to access the memory in accordance with the management information, wherein the control unit adds, to management information for the second process, information indicating that an area, in which the process-target data of the first process is held in the memory, is permitted to be accessed, when the judgment unit judges that the second process is authorized to use the process-target data of the first process.

With the above-stated structure in which the management information is restricted to be rewritten only in the protected mode, it is possible to prevent other processes, which operate in the normal mode, from rewriting the management information such that data can be leaked to outside.

In the above-described data processing device, the management information held by the holding sub-unit may include one or more pieces of information in each of which an address allocated in the memory and a key are associated, the access restriction sub-unit includes: an obtaining further sub-unit operable to obtain a memory access request that requests for accessing the memory and includes the address allocated in the memory; an address judgment further sub-unit operable to judge whether or not the address included in the memory access request is included in the management information; and an access execution further sub-unit operable to, if the address judgment further sub-unit judges that the address included in the memory access request is included in the management information, generate encrypted data by encrypting data using the key corresponding to the address and writes the encrypted data into an area at the address if the memory access request is a write request, and read encrypted data from the area at the address, generate decrypted data by decrypting the read encrypted data using the key corresponding to the address, and output the decrypted data if the memory access request is a read request.

With the above-stated structure in which data is encrypted using a key that is assigned for each address for each process, the encrypted data is recorded onto the memory, the recorded encrypted data is read out, and the read-out encrypted data is decrypted, it is possible to prevent the data from being used inappropriately by other processes.

It should be noted here that the memory access request includes a use permission request requesting for using an area in the memory, and a sharing setting request requesting that the requesting process itself is permitted to use a memory area together with another process that is also permitted to use the area, as well as the read request requesting for reading data from the memory, and the write request requesting for writing data onto the memory.

In the above-described data processing device, the data may be code for a process.

With the above-stated structure, it is possible to prevent the code for the process from being leaked to outside.

In the above-described data processing device, each process may be uniquely assigned a process identifier, the management information held by the holding sub-unit includes one or more pieces of information in each of which an address allocated in the memory and a process identifier of a process that is a source of the memory access request are associated, the access restriction sub-unit includes: an obtaining further sub-unit operable to obtain a memory access request that requests for accessing the memory and includes the address allocated in the memory; an address judgment further sub-unit operable to judge whether or not the management information includes a piece of information in which the address included in the memory access request and a process identifier of a process that is a source of the memory access request are associated; and an access execution further sub-unit operable to, if the address judgment further sub-unit judges that the management information includes the piece of information, cause the process, which is the source of the memory access request, to access the address allocated in the memory.

With the above-stated structure, not all memory access requests are accepted, but accesses to an address allocated in the memory are restricted to a process having a process identifier that corresponds to the address specified by the access requests, the correspondence being shown by the management information.

In the above-described data processing device, the data may be assigned with security requirement information that indicates whether or not one or more data processing methods, with respect to each thereof, are permitted to be performed, each process is assigned with function information that indicates whether or not the process itself can execute the one or more data processing methods, with respect to each thereof, the call instruction includes process specification information that specify one of the one or more data processing methods, the judgment unit judges that the second process is authorized to use the process-target data of the first process if the security requirement information indicates that the data processing method, which is specified by the process specification information, is permitted to be performed, and if function information for the second process indicates that the second process can execute the data processing method specified by the process specification information.

With the above-stated structure, it is possible to restrict processing of data that is requested to be processed in cooperation, to data processing methods that are permitted by the security requirement information assigned to the data, and are indicated by the function information for the second process to be executable, thus it is possible to reduce the possibility of data leakage.

In the above-described data processing device, the switch unit, when switching the operation mode from the normal mode to the protected mode, may save a context of a process that is running in the normal mode, into a memory, and when switching the operation mode from the protected mode to the normal mode, restore a context of a process that is to run next in the normal mode, from the memory.

With the above-stated structure, it is possible to restrict the saving and restoring of a context to be executed in the protected mode. This prevents a process, which runs in the normal mode, from operating onto the context in an unauthorized manner, and prevents data from being leaked to outside.

In the above-described data processing device, the first process and the second process may include either an interrupt process or an exception process that processes an interrupt or an exception if the interrupt or the exception occurs while any of the first process and the second process is running, the data processing device further comprising: a vector table holding unit holding a vector table such that the vector table can be rewritten only in the protected mode, the vector table indicating a process that is to be performed if an interrupt or an exception occurs; and a vector table rewriting unit operable to rewrite, in the protected mode before a currently running process switches from the first process to the second process, the vector table to indicate that an interrupt process or an exception process for the second process is to be performed if an interrupt or an exception occurs in the normal mode.

With the above-stated structure, it is possible to restrict the vector table to be rewritten only in the protected mode. This prevents a process, which runs in the normal mode, from rewriting the vector table in an unauthorized manner to run an unauthorized process, and prevents data from being leaked to outside.

In the above-described data processing device, the judgment unit may include: a use request receiving sub-unit operable to receive, from a process, a use request for using an area at an address in the memory; a use judgment sub-unit operable to judge whether or not the area at the address has been used; an authority judgment sub-unit operable to, if the use judgment sub-unit judges that the area at the address has not been used, judge whether or not the process, from which the use request was received, is authorized to use data that the process requests to be stored in the area at the address; and a management information registration sub-unit operable to register information, which permits an access to the area at the address, with management information for the process from which the use request was received, if the authority judgment sub-unit judges that the process is authorized to use the data.

With the above-stated structure, it is possible to, in response to a request from a process, generate management information such that only the process that requested to use a memory area can use the memory area. This prevents other processes from leaking data from the memory area.

In the above-described data processing device, if the authority judgment sub-unit judges that the process is authorized to use the data, the management information registration sub-unit may generate a key and adds information, in which the address and the generated key a reassociated, to the management information for the process from which the use request was received, as the information for permitting an access to the area at the address.

With the above-stated structure, it is possible to add each key, which is generated each time a request is received, to the management information.

This makes it possible, for example, to use a different key for each address, which reduces the frequency that the same key is used, thus reduces the probability that the key is deciphered.

The above-described data processing device may further comprise a debug unit operable to perform debugging for the process, and the switch unit may further validate the debug unit when switching the operation mode from the protected mode to the normal mode, and invalidate the debug unit when switching the operation mode from the normal mode to the protected mode.

With the above-stated structure, it is possible to prohibit debugging in the protected mode, thus preventing analysis of contents of the processes that are performed in the protected mode.

The above-stated object is also fulfilled by a data processing method for use in a data processing device which has a processor that operates in accordance with a program, and operates with switching operation mode between a normal mode and a protected mode, wherein, in the normal mode, a process being a unit of execution of the program runs, and in the protected mode, the process is restricted from running, the data processing method comprising the steps of: permitting, in the normal mode, a first process to access process-target data of the first process, and prohibiting another process from accessing the process-target data of the first process; detecting, in the normal mode, a call instruction from the first process to a second process; switching the operation mode from the normal mode to the protected mode, if the detection step detects the call instruction; judging, in the protected mode, whether or not the second process is authorized to use the process-target data of the first process; and controlling the access prohibit step to permit the second process to access the process-target data of the first process in the normal mode, when the judgment step, in the protected mode, judges that the second process is authorized to use the process-target data of the first process.

The above-stated object is also fulfilled by a computer program for use in a data processing device which has a processor that operates in accordance with a program, and operates with switching operation mode between a normal mode and a protected mode, wherein, in the normal mode, a process being a unit of execution of the program runs, and in the protected mode, the process is restricted from running, the computer program comprising the steps of: permitting, in the normal mode, a first process to access process-target data of the first process, and prohibiting another process from accessing the process-target data of the first process; detecting, in the normal mode, a call instruction from the first process to a second process; switching the operation mode from the normal mode to the protected mode, if the detection step detects the call instruction; judging, in the protected mode, whether or not the second process is authorized to use the process-target data of the first process; and controlling the access prohibit step to permit the second process to access the process-target data of the first process in the normal mode, when the judgment step, in the protected mode, judges that the second process is authorized to use the process-target data of the first process.

With the above-stated structure, the first process can transfer data to the second process such that the data transfer is not known to processes other than the second process. This prevents the data from being leaked to outside by other processes that operate in the normal mode.

Further, with the above-stated structure, even if the second program is updated with respect to its function such that it loses the authority to use the process target data of the first process, the judgment step detects it and the control step can prevent leakage of the information.

The above-stated object is also fulfilled by an integrated circuit which has a processor that operates in accordance with a program, and operates with switching operation mode between a normal mode and a protected mode, wherein, in the normal mode, a process being a unit of execution of the program runs, and in the protected mode, the process is restricted from running, the integrated circuit comprising: an access prohibit unit operable to, in the normal mode, permit a first process to access process-target data of the first process, and prohibit another process from accessing the process-target data of the first process; a detection unit operable to, in the normal mode, detect a call instruction from the first process to a second process; a switch unit operable to, if the detection unit detects the call instruction, switch operation mode from the normal mode to the protected mode; a judgment unit operable to, in the protected mode, judge whether or not the second process is authorized to use the process-target data of the first process; and a control unit operable to control the access prohibit unit to permit the second process to access the process-target data of the first process in the normal mode, when the judgment unit, in the protected mode, judges that the second process is authorized to use the process-target data of the first process.

With the above-stated structure, the first process can transfer data to the second process such that the data transfer is not known to processes other than the second process. This prevents the data from being leaked to outside by other processes that operate in the normal mode.

Further, with the above-stated structure, even if the second program is updated with respect to its function such that it loses the authority to use the process target data of the first process, the judgment unit detects it and the control unit can prevent leakage of the information.

BRIEF DESCRIPTION OF THE DRAWING

FIG. 9 shows the structure of the management table.

FIGS. 11A and 11B are flowcharts showing the process of the mode change operations A and B.

FIG. 17 shows the status of the management table while the program protection device is operating.

FIG. 18 shows the status of the management table while the program protection device is operating.

FIG. 19 shows the status of the management table while the program protection device is operating.

DESCRIPTION OF CHARACTERS 0101 program protection device
0102 program A
0103 program B
0104 operating system (OS)
0105 unauthorized operation prevention circuit
0106 unauthorized operation prevention control unit
0107 program C
0108 protection target data
0109 security requirement list
0110 management table
0201 CPU
0202 RAM
0203 nonvolatile memory
0204 bus encryption circuit
0205 key register
0206 protected memory
0209 debugger interface
0210 bus
0216 storage medium
0219 vector table
0221 nonvolatile memory
0401 security kernel
0402 program A interrupt management unit
0403 program B interrupt management unit
0404 OS interrupt management unit
0405 BIOS
0406 program C interrupt management unit

BEST MODE FOR CARRYING OUT THE INVENTION

Embodiment 1

1. Outline

Figure 1:
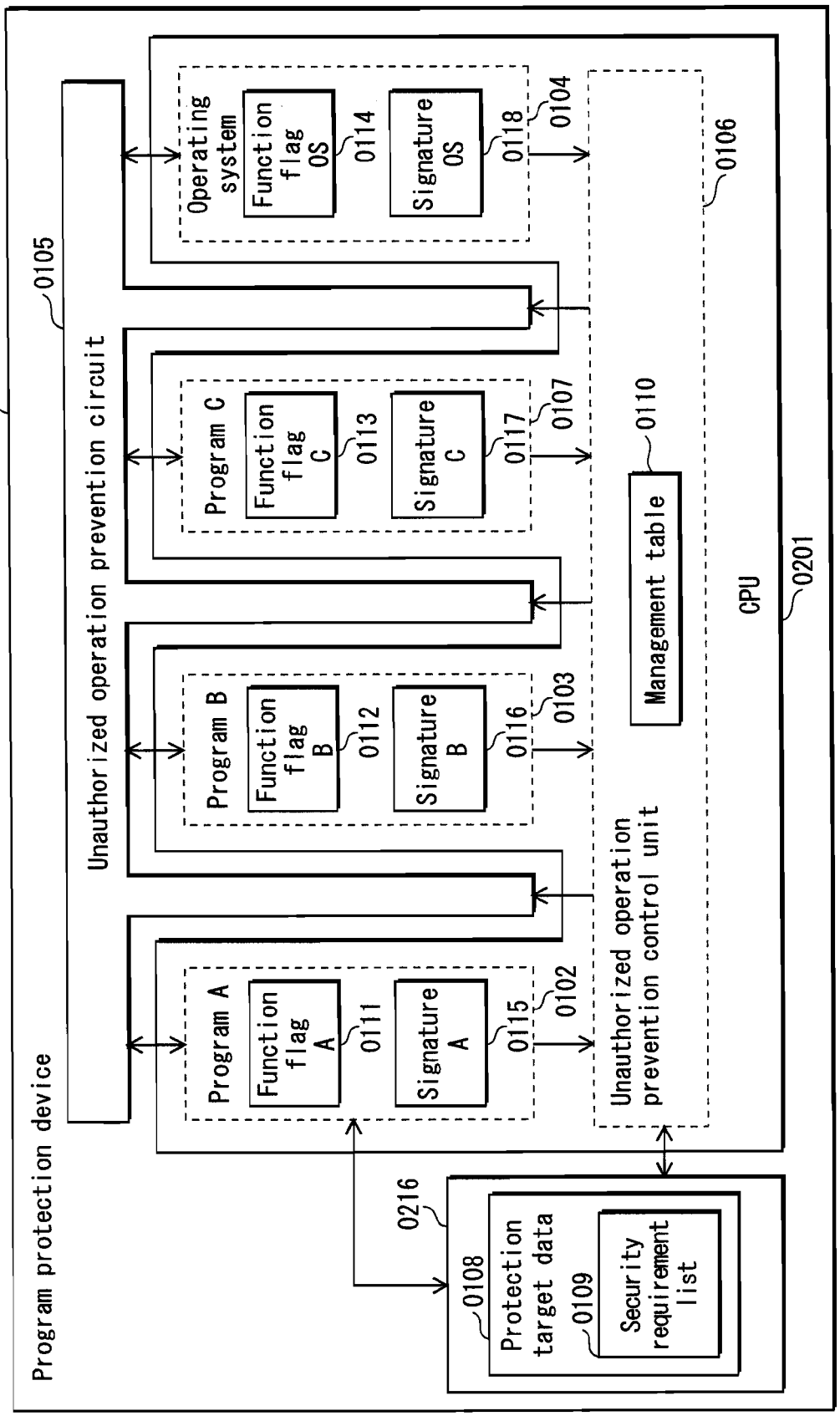
FIG. 1 schematically shows a main part in structure of a program protection device of the present invention.

FIG. 1 schematically shows a main part in structure of a program protection device 0101.

As shown in FIG. 1, the program protection device 0101 includes a CPU 0201, an unauthorized operation prevention circuit 0105, and a storage medium 0216.

The CPU 0201 is a processor for executing a program.

The unauthorized operation prevention circuit 0105 is a circuit provided with a mechanism for preventing an unauthorized execution of the program that is executed by the CPU 0201, and preventing an unauthorized access between programs.

The storage medium 0216 stores, in an encrypted state, protection target data 0108 that is confidential information, such as contents or personal information, and is used by the program executed by the CPU 0201.

The programs executed by the CPU 0201 include, for example, as shown in FIG. 1, an operating system (OS) 0104, a program A 0102, a program B 0103, a program C 0107, and an unauthorized operation prevention control unit 0106.

The unauthorized operation prevention control unit 0106 receives a request for using a memory area from the program A 0102, the program B 0103, the program C 0107, or the OS 0104, judges whether or not to permit using the requested memory area, and if it permits using, controls the unauthorized operation prevention circuit 0105 so that the requested memory area is used only in a manner specified by the request source program.

The operating system (OS) 0104 is basic software that runs the program A 0102, the program B 0103, the program C 0107, and other programs (not illustrated).

The program A 0102, the program B 0103, and the program C 0107 are application programs for executing processes. In the present embodiment, as one example, the program A 0102 decrypts the protection target data 0108 being a content, the program B 0103 is a player program for playing back the content, and the program A 0102 and the program B 0103 operate in cooperation with each other in processing the content.

The program A 0102 decrypts the protection target data 0108 that is an encrypted content, and causes the program B 0103 to play back the decrypted content. The program A 0102 includes a call instruction for calling the program B 0103. Upon detecting the call instruction, the CPU 0201 issues, to the unauthorized operation prevention circuit 0105, a mode switch instruction indicating a protected mode, which will be described later. The unauthorized operation prevention circuit 0105 causes the mode to switch to the protected mode in accordance with the mode switch instruction, and executes the process.

It should be noted here that the call instruction contains information that indicates a data processing method such as an output, copy, move, special playback, or digital output of a content.

With a structure where the unauthorized operation prevention control unit 0106 controls the unauthorized operation prevention circuit 0105 in the above-mentioned protected mode, for example, the program C 0107 is prevented from using the content in an unauthorized manner, or from destroying the content.

The following provides a detailed description of the operation of the program protection device 0101.

2. Structure

<2.1. Hardware Structure>

The hardware structure of the program protection device 0101 will be described with reference to the drawings.

Figure 2:
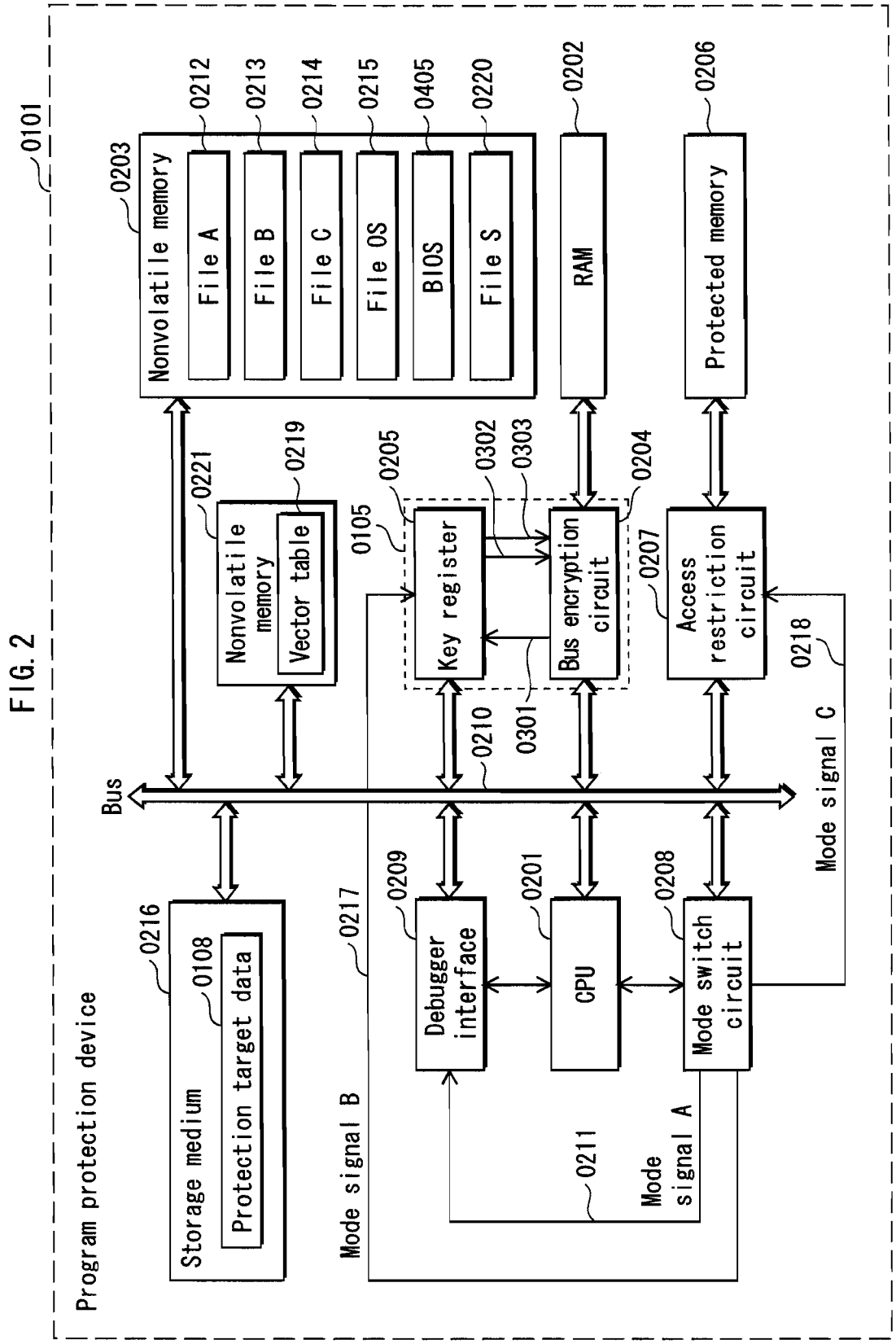
FIG. 2 shows the hardware structure of the program protection device of the present invention.

As shown in FIG. 2, the program protection device 0101 includes the CPU 0201, a nonvolatile memory 0203, a bus encryption circuit 0204, a key register 0205, an access restriction circuit 0207, a mode switch circuit 0208, a debugger interface 0209, the storage medium 0216, a nonvolatile memory 0221, a RAM 0202 connected to the bus encryption circuit 0204, and a protected memory 0206 connected to the access restriction circuit 0207.

The program protection device 0101 is more specifically a computer system including a microprocessor, a ROM, a RAM and the like. A computer program is recorded in the ROM. The program protection device 0101 achieves its functions as the microprocessor operates in accordance with the computer program.

The CPU 0201 is a microprocessor for executing programs stored in the RAM 0202 and the protected memory 0206.

The mode switch circuit 0208, upon receiving a mode switch instruction selectively indicating the normal mode or the protected mode, causes the mode of the debugger interface 0209, the key register 0205, and the access restriction circuit 0207 to switch to the mode indicated by the received mode switch instruction.

In the protected mode, only a predetermined program with high security operates, and in the normal mode, the other programs operate.

The mode switch circuit 0208, when the received mode switch instruction indicates the protected mode, outputs a mode signal A 0211 indicating the protected mode to the debugger interface 0209 to invalidate the debugger interface 0209, outputs a mode signal B 0217 indicating the protected mode to the key register 0205, and outputs a mode signal C 0218 indicating the protected mode to the access restriction circuit 0207.

The mode switch circuit 0208, when the received mode switch instruction indicates the normal mode, outputs the mode signal A 0211 indicating the normal mode to the debugger interface 0209, and outputs the mode signal C 0218 indicating the normal mode to the access restriction circuit 0207. Also, the mode switch circuit 0208 changes a vector table 0219 as necessary. The mode change operation and the changing of the vector table 0219 will be described later.

Details of the mode change are disclosed in Japanese Patent Application Publication No 2005-11336, which was filed by the inventors of the present application, and the like.

The access restriction circuit 0207 controls the connection between a bus 0210 and the protected memory 0206. More specifically, when the mode signal C received from the mode switch circuit 0208 indicates the normal mode, the access restriction circuit 0207 shuts the connection between the bus 0210 and the protected memory 0206, and when the mode signal C indicates the protected mode, the access restriction circuit 0207 connects the bus 0210 with the protected memory 0206. Accordingly, the programs operating in the normal mode cannot access the data stored in the protected memory 0206.

The debugger interface 0209 can connect to a program debugger outside the program protection device 0101, and is connected to the CPU 0201.

The debugger interface 0209, when the mode signal A received from the mode switch circuit 0208 indicates the normal mode, connects the program debugger with the CPU 0201, and when the mode signal A indicates the protected mode, shuts the connection between the program debugger and the CPU 0201.

Also, even if the mode signal A indicates the normal mode, it is possible for the debugger interface 0209 to forcibly shut the connection between the program debugger and the CPU 0201 by changing the setting of the debugger interface 0209.

The key register 0205 is a circuit that outputs, to the bus encryption circuit 0204, an encryption key corresponding to an address requested to be accessed.

Figure 3:
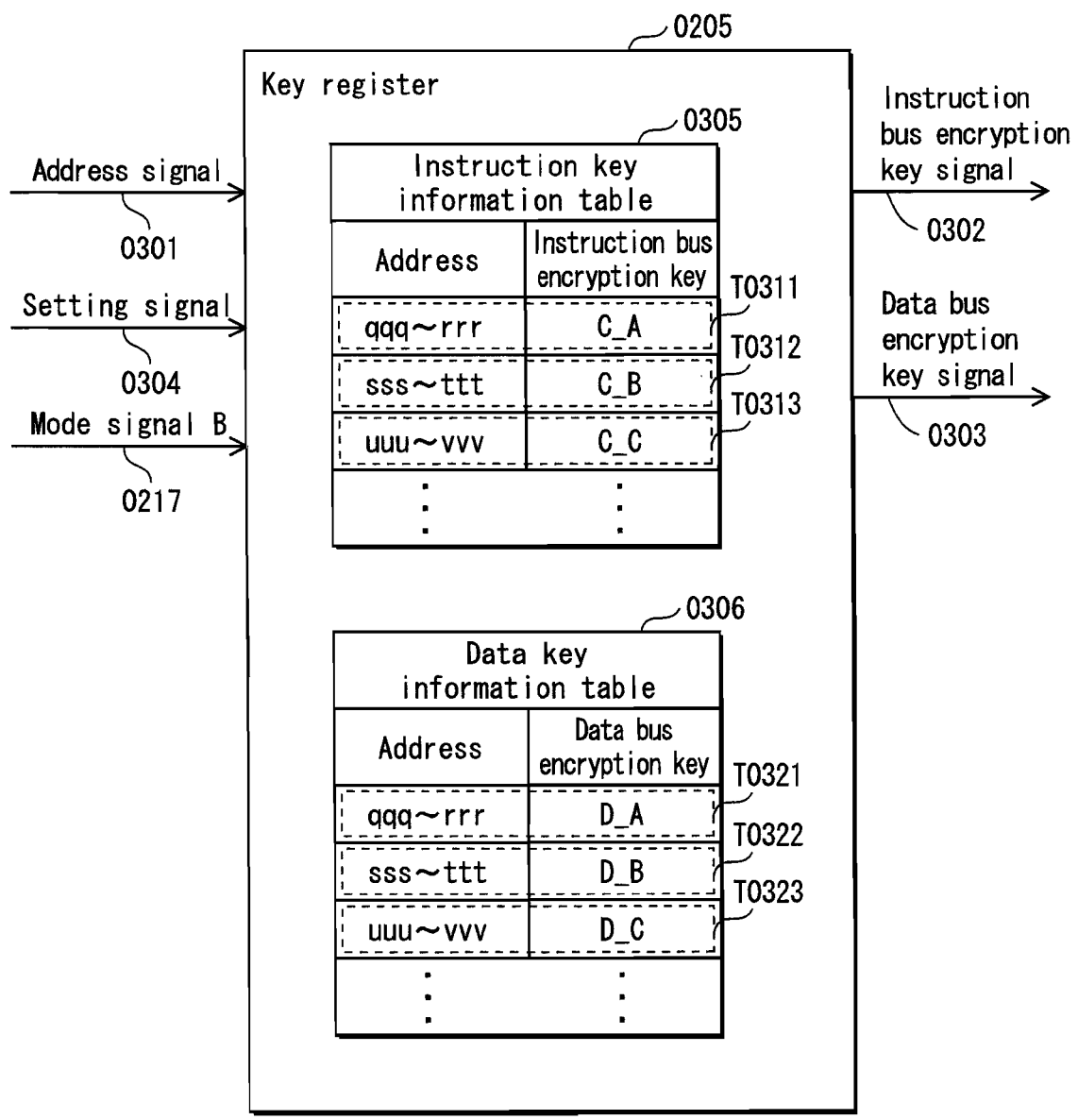
FIG. 3 shows the structure of the key register.

The key register 0205, as shown in FIG. 3, holds an instruction key information table 0305 and a data key information table 0306, where the instruction key information table 0305 indicates correspondence between addresses and instruction bus encryption keys, and the data key information table 0306 indicates correspondence between addresses and data bus encryption keys. The key register 0205 obtains an address signal 0301 from the bus encryption circuit 0204, and outputs an instruction bus encryption key signal 0302 and a data bus encryption key signal 0303, which correspond to an address indicated by the address signal 0301, to the bus encryption circuit 0204.

Here, the instruction key information table 0305 includes instruction key information T0311, T0312, T0313, . . . . Each piece of instruction key information indicates correspondence between an address and an instruction bus encryption key. The data key information table 0306 includes data key information T0321, T0322, T0323, . . . . Each piece of data key information indicates correspondence between an address and a data bus encryption key.

The setting of the key register 0205 can be changed only when the mode signal B output from the mode switch circuit 0208 indicates the protected mode, and is changed by the unauthorized operation prevention control unit 0106 using a setting signal 0304 that is notified via the bus 0210.

The RAM 0202 is a memory device connected to the bus encryption circuit 0204.

The bus encryption circuit 0204 encrypts or decrypts code or data that is input or output to a memory address, using a key corresponding to the memory address, where the key is notified from the key register 0205.

With this structure, the code and data that are transferred between the bus 0210 and the RAM 0202 are encrypted and decrypted by the bus encryption circuit 0204.

The bus encryption circuit 0204 also detects whether the CPU 0201 accesses the RAM 0202 to fetch an instruction or to access data, and encrypts or decrypts code or data using an instruction bus encryption key when the CPU 0201 accesses the RAM 0202 to fetch an instruction from the same physical address, and using a data bus encryption key when the CPU 0201 accesses the RAM 0202 to access data.

The nonvolatile memory 0203 stores a file A 0212, a file B 0213, a file C 0214, a file OS 0215, a BIOS 0405, and a file S 0220.

Here will be described the data structure of the file, using the data structure of the file A 0212 as an example, with reference to FIG. 5.

The file A 0212 includes a code encryption key 0710, a code 0711 for the program A 0102, a signature A 0115, and a function flag A 0111.

The code encryption key 0710 is a key (KC_A) that was used to encrypt the code 0711 for the program A 0102.

The code encryption key 0710 has been encrypted with a public key encryption algorithm.

A secret key corresponding to a public key that was used to encrypt the code encryption key 0710 is held by the unauthorized operation prevention control unit 0106.

A process performed by the program A 0102 is described in the code 0711 for the program A, and is executed by the CPU 0201.

The code 0711 for the program A has been encrypted using the code encryption key 0710.

The signature A 0115 is a signature of a vender who encrypted the code 0711 for the program A.

The signature A 0115 is used to verify the authenticity and completeness of the code 0711 for the program A.

The function flag A 0111 indicates whether or not the program A 0102 has functions 0714, 0715, 0716, 0717, 0718, . . . .

In the present embodiment, the function flag indicates whether or not the program has any of the functions: file output; copy; move; special playback; and digital output.

The function flag is data composed of, for example, five bits, and the functions: file output; copy; move; special playback; and digital output are assigned to the five bits, respectively. For example: if the program has the file output function and the move function, the function flag is "10100" in binary number notation; and if the program has only the digital output function, the function flag is "00001" in binary number notation. In the present example, the function flag A 0111 for the program A 0102 is "00000" in binary number notation, indicating that the program has no function.

Figure 5:
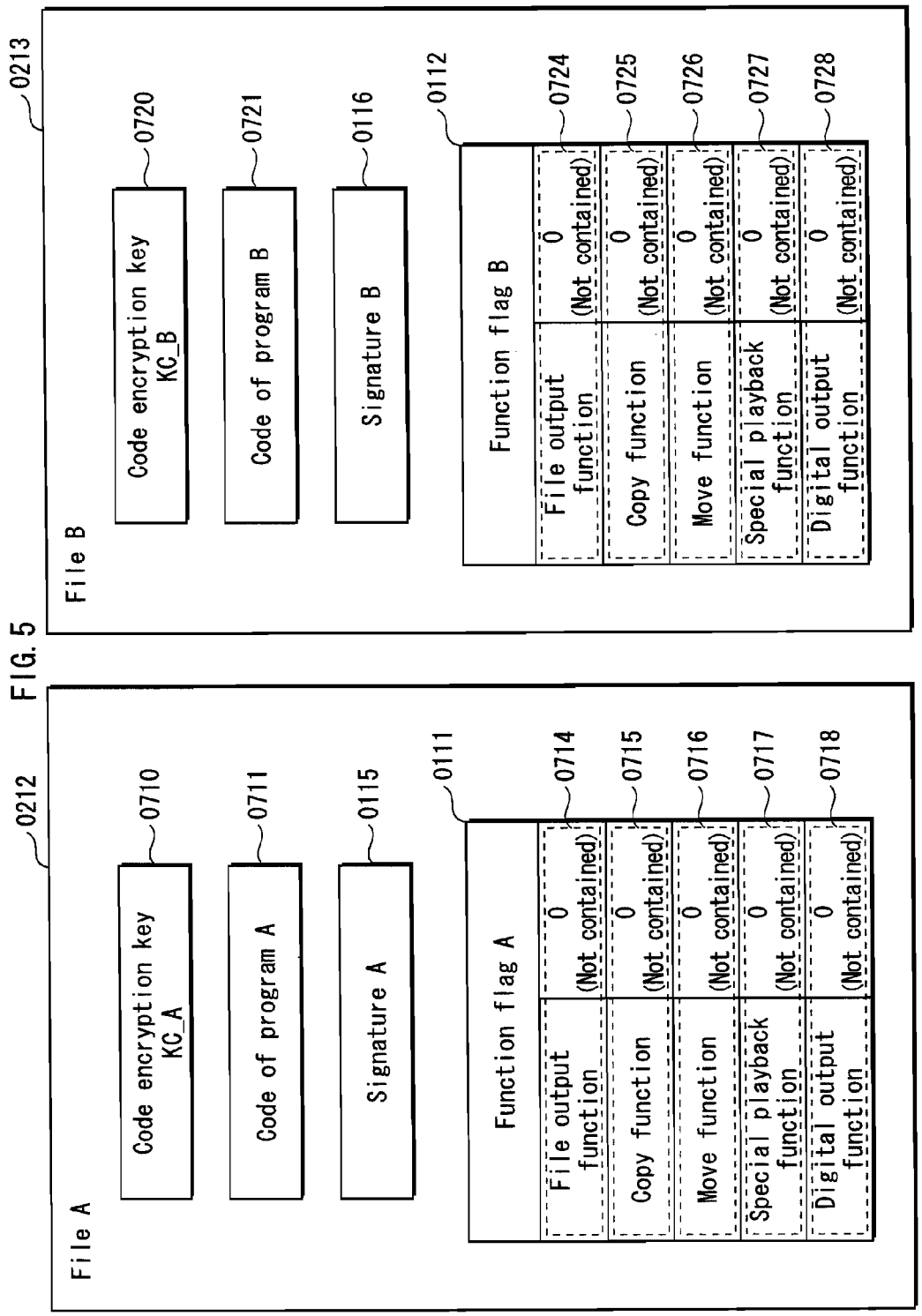
FIG. 5 schematically shows the structure of the file for recording the program.
Figure 6:
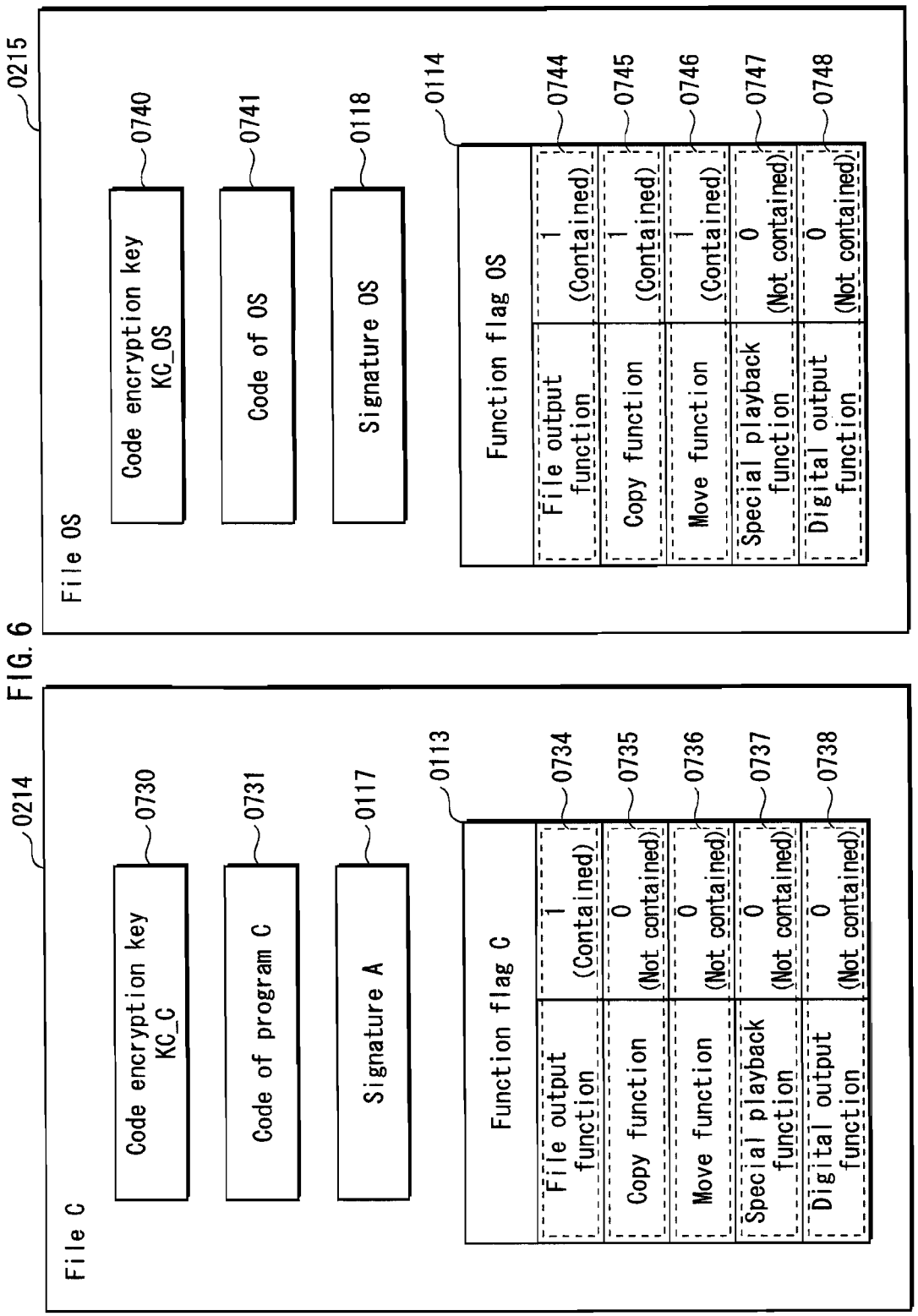
FIG. 6 schematically shows the structure of the file for recording the program.

The data structure of the file B 0213 is shown in FIG. 5, and the data structures of the file C 0214 and the file OS 0215 are shown in FIG. 6. The file B 0213, the file C 0214 and the file OS 0215 have the same data structure as the file A 0212, and description thereof is omitted.

The function flag C 0113 for the file C 0214 indicates that the program has a file output function 0734, and the function flag OS 0114 for the file OS 0215 indicates that the program has a file output function 0744, a copy function 0745, and a move function 0746.

The nonvolatile memory 0221 is a memory device storing the vector table 0219 that indicates addresses of exception handlers and interrupt handlers.

In the program protection device 0101, upon detection of an exception or an interrupt, the CPU 0201 refers to the vector table 0219 and obtains the address of the handler to execute next.

Only the mode switch circuit 0208 can change the handler addresses stored in the vector table 0219 that respectively correspond to the exceptions and interrupts. Only software that operates in the protected mode can request the mode switch circuit 0208 to change the settings within the vector table 0219.

The storage medium 0216 stores, in an encrypted state, the protection target data 0108 that is confidential information, such as contents or personal information.

Figure 4:
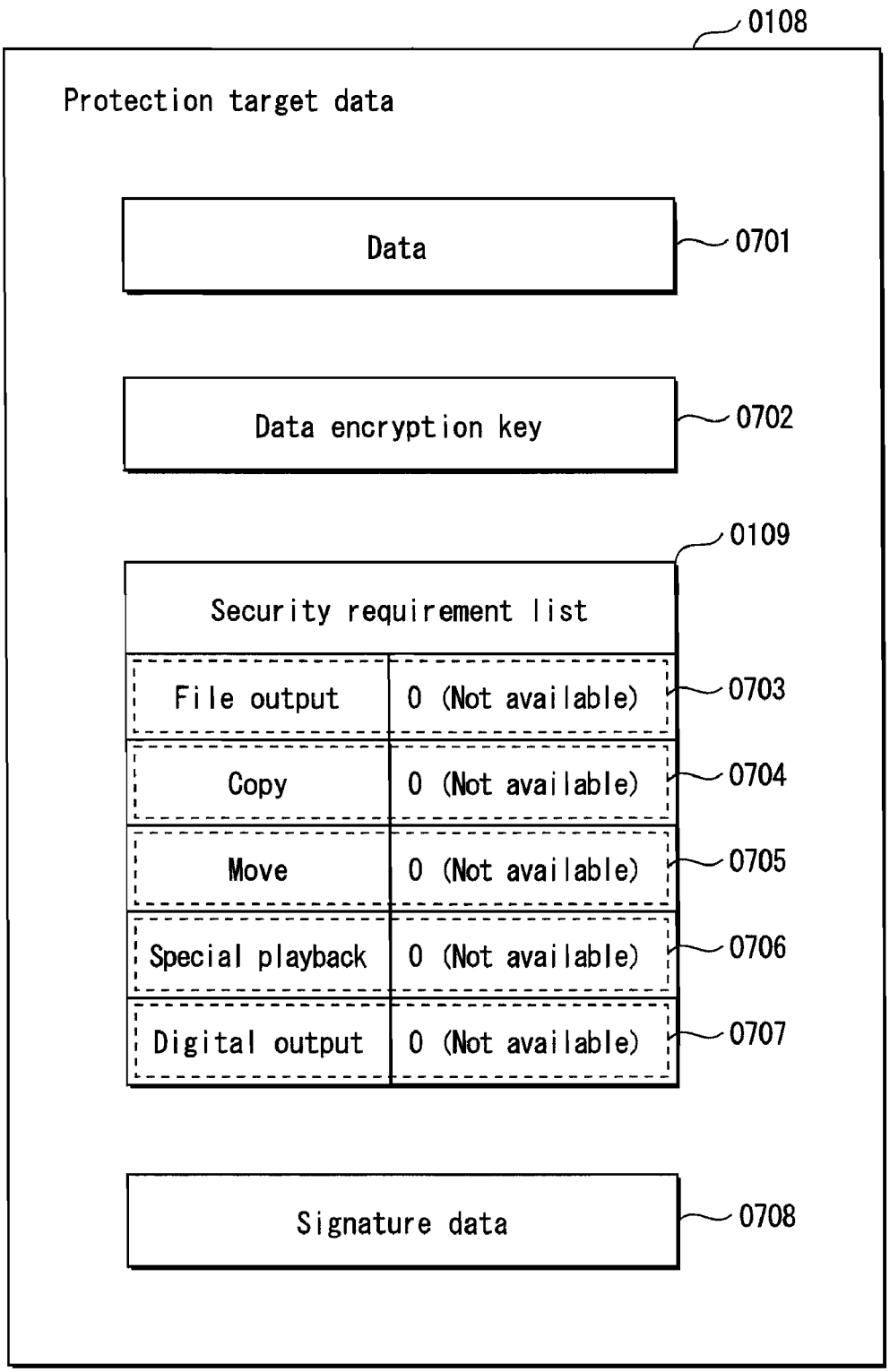
FIG. 4 shows the structure of the protection target data.

The protection target data 0108, as shown in FIG. 4, includes data 0701, a data encryption key 0702, a security requirement list 0109, and signature data 0708.

The data 0701 is protection target data and has been encrypted using the data encryption key 0702. It should be noted here that the data 0701 has not necessarily been encrypted.

The data encryption key 0702 has been encrypted using a public key encryption algorithm. A secret key corresponding to a public key that was used to encrypt the data encryption key 0702 is held by the unauthorized operation prevention control unit 0106. Accordingly, only the unauthorized operation prevention control unit 0106 can decrypt the data encryption key 0702.

The security requirement list 0109 contains security requirements 0703, 0704, 0705, 0706, 0707, . . . . The security requirement list is, for example, five-bit data, where the five bits respectively correspond to the functions: file output; copy; move; special playback; and digital output. When a bit value is "1", it indicates that the corresponding function is available, and a bit value is "0", it indicates that the corresponding function is not available.

For example: if the file output function and the move function are available, the security requirement list is "10100" in binary number notation; and if only the digital output function is available, the security requirement list is "00001" in binary number notation.

In the present example, the security requirements 0703, 0704, 0705, 0706, and 0707 are not available at all.

The signature data 0708 is a signature for the security requirement list 0109 and is used to verify the authenticity of the security requirement list 0109.

<2.2. Software Structure>

Next, the software structure of the program protection device 0101 will be described with reference to the drawings.

Figure 7:
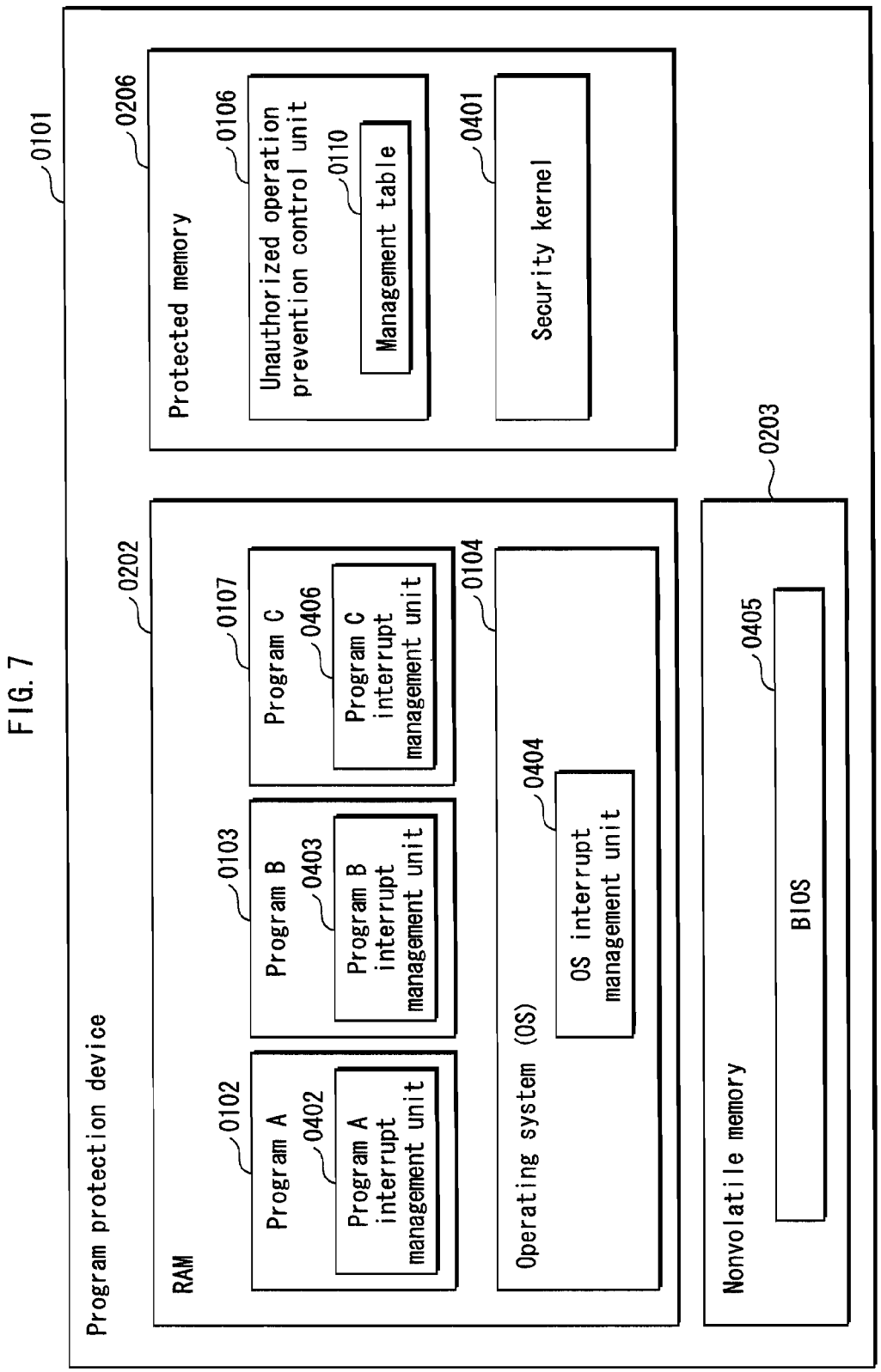
FIG. 7 shows the software structure of the program protection device.

As shown in FIG. 7, the programs that run on the CPU 0201 of the program protection device 0101 include the operating system (OS) 0104 containing an OS interrupt management unit 0404, the program A 0102 containing a program A interrupt management unit 0402, the program B 0103 containing a program B interrupt management unit 0403, the program C 0107 containing a program C interrupt management unit 0406, the security kernel 0401, the unauthorized operation prevention control unit 0106, and the BIOS 0405.

The BIOS 0405 is stored in the nonvolatile memory 0203, and is executed by the CPU 0201 in the normal mode when, for example, the program protection device 0101 is powered on.

The BIOS 0405 performs basic settings of the hardware, and then loads the OS 0104 on to the RAM 0202. In the present embodiment, the BIOS 0405 loads only the OS 0104. However, not limited to this, the BIOS 0405 may further load the program A 0102, the program B 0103, and the program C 0107.

The OS 0104 has general functions of the operating system, and after booted, it activates the program A 0102, the program B 0103, and the program C 0107 in order.

The OS interrupt management unit 0404 contained in the OS 0104 includes a handler for handing an interrupt or an exception that occurs while the OS 0104 is running.

The program A 0102, the program B 0103, and the program C 0107 run on the OS 0104 to perform general-purpose processes, and deal with the protection target data 0108.

The program A interrupt management unit 0402 contained in the program A 0102 includes a handler for processing an interrupt or an exception that occurs while the program A 0102 is running.

Similarly, the program B interrupt management unit 0403 contained in the program B 0103 and the program C interrupt management unit 0406 contained in the program C 0107 include handlers for processing an interrupt or an exception that occurs while the program B 0103 and the program C 0107 are running, respectively.

The program A 0102, the program B 0103, the program C 0107, and the OS 0104 are software that run in the normal mode, are loaded onto the RAM 0202, and are executed by the CPU 0201. The security kernel 0401 is software for performing a system control in the protected mode, is loaded onto the protected memory 0206, and is executed by the CPU 0201.

The security kernel 401 handles an interrupt or an exception that occurs in the protected mode, and executes a process onto the interrupt or exception it handles.

The contents of the vector table 0219 in the protected mode are rewritten by the protected memory 0206 immediately before the normal mode is switched to the protected mode so that the CPU 0201 executes a handler in the security kernel 0401 if an interrupt or an exception occurs.

The security kernel 0401 moves the control subject to the unauthorized operation prevention control unit 0106.

After the unauthorized operation prevention control unit 0106 ends an unauthorized operation prevention control process, the control subject returns back to the security kernel

0401, which outputs a mode switch request for switching to the normal mode, to the mode switch circuit 0208.

The unauthorized operation prevention control unit 0106 controls the unauthorized operation prevention circuit 0105 to prevent an unauthorized operation of a program such as the OS 0104.

The unauthorized operation prevention control unit 0106 is a program that runs in the protected mode, is loaded in the protected memory 0206, and is executed by the CPU 0201. This structure prevents a program, which runs in the normal mode and is not authorized to access the protected memory 0206, from accessing the security kernel 0401 or the unauthorized operation prevention control unit 0106.

The unauthorized operation prevention control unit 0106 manages a management table 0110 containing data that is used to control the unauthorized operation prevention circuit 0105.

(Management Table)

Figure 8:
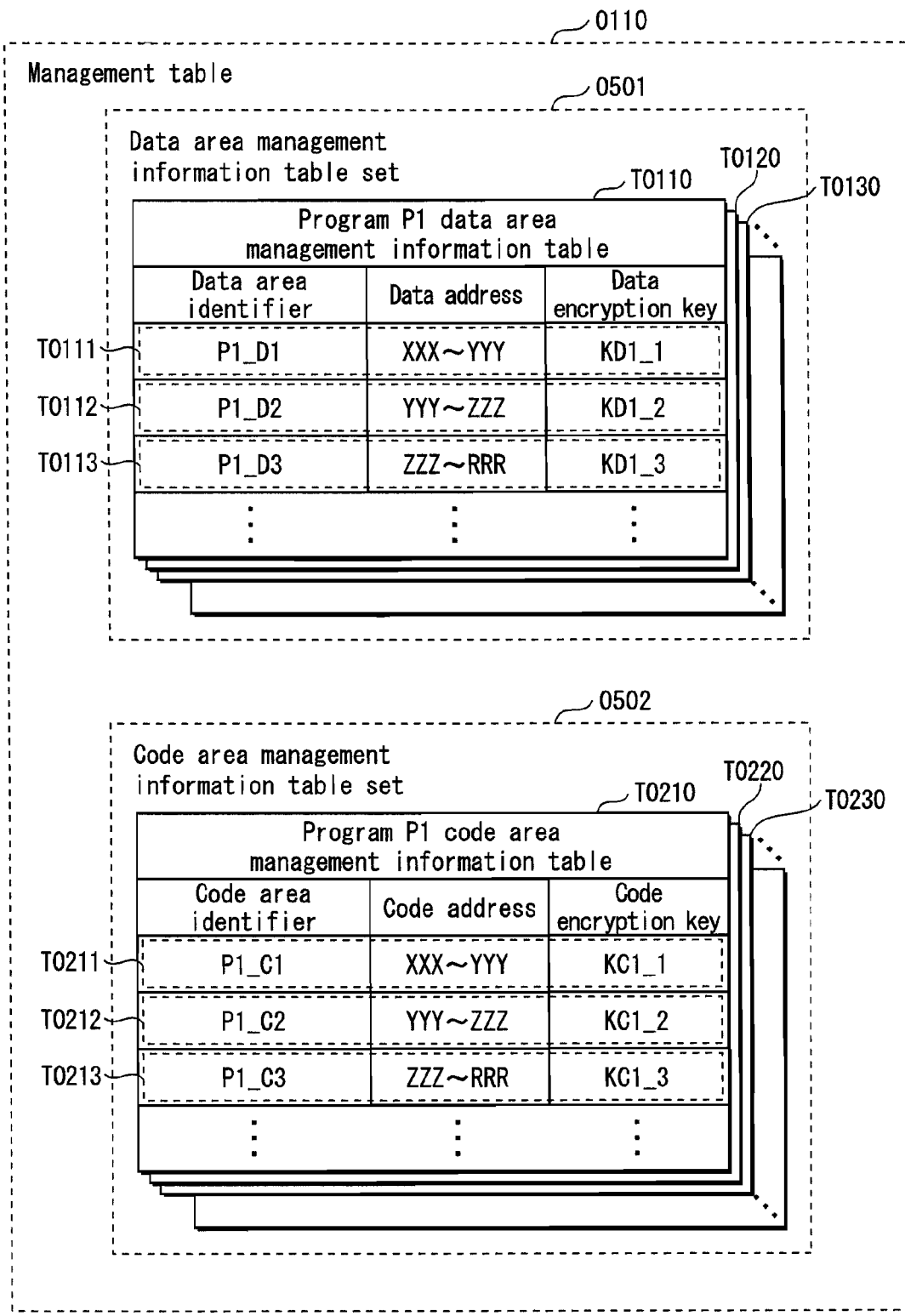
FIG. 8 shows the structure of the management table.

Here, the management table 0110 will be described with reference to FIGS. 8 and 9.

The management table 0110 is a management data set that is used to protect the data area and the code area for the program. The management table 0110 includes a data area management information table set 0501 and a code area management information table set 0502 as shown in FIG. 8, and includes a security requirement management information table T0310, a program management information table T0410, and a current program management table T0503 as shown in FIG. 9.

The data area management information table set 0501, the code area management information table set 0502, the security requirement management information table T0310, the program management information table T0410, and the current program management table T0503 are stored in the protected memory 0206.

Immediately after the program protection device 0101 is powered on, each table in the management table 0110 is empty.

The unauthorized operation prevention control unit 0106 registers with or updates the code area management information table set and the program management information table in accordance with a registration request that is made by the OS 0104 for the program A 0102, the program B 0103, and the program C 0107, in a program registration process which will be described later.

The unauthorized operation prevention control unit 0106 registers with or updates the data area management information table set in accordance with a protection setting request that is made by another program in a data area protection setting process which will be described later. Also, the unauthorized operation prevention control unit 0106 registers with or updates the security requirement management information table set in accordance with a sharing setting request that is made by another program in a data area sharing setting process which will be described later.

(Program Management Information Table T0410)

The program management information table T0410 includes program management information T0411, T0412, T0413, T0414, . . . .

Each piece of program management information includes a program management information identifier, a code address, a program identifier, a sharing program identifier, and a function flag.

The program management information identifier identifies a piece of program management information. When registering a piece of program management information, the unauthorized operation prevention control unit 0106 assigns a program management information identifier, which has not been assigned yet, to the piece of program management information.

The code address indicates an address area that is managed by each piece of program management information.

The program identifier is an identifier of a program that includes a code loaded in the address area, and is preliminarily assigned to each program.

The sharing program identifier is an identifier of a program that shares the code loaded in the address area.

The function flag indicates, with respect to the code loaded in the address area, whether or not any of the functions: file output; copy; move; special playback; and digital output are permitted.

The function flag is data composed of, for example, five bits, and the functions: file output; copy; move; special playback; and digital output are assigned to the five bits, respectively. For example: if the file output function and the move function are permitted, the function flag is "10100" in binary number notation; and if only the digital output function is permitted, the function flag is "00001" in binary number notation.

(Code Area Management Information Table Set)

The code area management information table set 0502 includes program code area management information tables T0210, T0220, T0230, . . . which are generated in correspondence with the programs on a one-to-one basis.

A program P1 code area management information table T0210, which is generated for a program whose program identifier is P1, includes code area management information T0211, T0212, T0213, . . . , and the data area management information includes a code area identifier, a code address, and a code encryption key.

The code area identifier identifies a piece of code area management information. When generating a piece of code area management information, the unauthorized operation prevention control unit 0106 assigns a code area identifier, which has not been assigned yet, to the piece of code area management information.

The code address indicates an address area that is managed by each piece of code area management information.

The code encryption key is used to encrypt or decrypt a code stored in a memory area that is indicated by the address area, and is used to access the code.

(Data Area Management Information Table Set)

The data area management information table set 0501 includes data area management information tables T0110, T0120, T0130, . . . .

The data area management information tables are generated in correspondence with the programs on a one-to-one basis, and include a data area identifier, a data address, and a data encryption key.

The data area identifier identifies a piece of data area management information.

The data encryption key is used to encrypt or decrypt data stored in a memory area that is indicated by the address area, and is used to access the data.

(Security Requirement Management Information Table)

The security requirement management information table T0310 is used to manage security requirements for each piece of data area management information contained in the data area management information table set 0501, and includes a plurality of pieces of security requirement management information T0311, T0312, T0313, T0314, . . . .

The security requirement management information includes a security requirement management information identifier, a data address, a generator program identifier, a sharing program identifier, and a security requirement. The security requirement management information identifier identifies a piece of security requirement management information.

The data address indicates an address area that is managed by each piece of security requirement management information.

The generator program identifier identifies a program that first set the data for the address area on the physical memory.

The sharing program identifier identifies a program that shares a memory area indicated by the address area on the physical memory.

The security requirement defines a method of protecting data stored in the address area on the physical memory that is indicated by the data address.

It is presumed in the present embodiment that the security requirement has the same structure as the function flag, and for example, is a five-bit data, where the five bits respectively indicate whether the functions: file output; copy; move; special playback; and digital output are available, respectively.

For example: if the file output function and the move function are available, the function flag is "10100" in binary number notation; and if only the digital output function is available, the function flag is "00001" in binary number notation.

(Current Program Management Table T0503)

The current program management table T0503 stores an identifier of a program that is currently running.

3. Software Operation

Next, the process flow of the software that runs on the program protection device 0101 will be described.

First, the process flow of the entire software will be described with reference to FIG. 21.

When the program protection device 0101 is powered on, the BIOS 0405 is booted (step S2011).

The BIOS 0405 performs basic settings of the hardware of the program protection device 0101, and then loads the OS 0104 onto the RAM 0202 (step S2012).

The OS 0104 performs a registration process, which will be described later, for registering the own program, namely, the OS 0104 itself with the unauthorized operation prevention control unit 0106 (step S2020), performs a registration process for registering the program A 0102 (step S2021), performs a registration process for registering the program B 0103 (step S2022), and performs a registration process for registering the program C 0107 (step S2023).

After the registration processes are performed, the unauthorized operation prevention control unit 0106 can process requests, such as a memory protection request, from the OS 0104, the program A 0102, the program B 0103, and the program C 0107.

Next, the OS 0104 activates, in order, the program A 0102, the program B 0103, and the program C0107 that have been registered by the registration processes (step S2031).

With this step, the program A 0102, the program B 0103, and the program C 0107 start operating on the OS 0104.

Next, the OS 0104 performs a protection setting, which will be described later, on the unauthorized operation prevention control unit 0106 for protecting the data area used by the own program (step S2040).

Similarly, the program A 0102 performs a protection setting, which will be described later, on the unauthorized operation prevention control unit 0106 for protecting the data area used by the own program (step S2041), the program B 0103 performs a protection setting on the unauthorized operation prevention control unit 0106 for protecting the data area used by the own program (step S2042), and the program C0107 performs a protection setting on the unauthorized operation prevention control unit 0106 for protecting the data area used by the own program (step S2043).

Next, if necessary, the program A 0102 performs a data area sharing setting, which will be described later, on the unauthorized operation prevention control unit 0106 for sharing the data area with other programs (step S2051).

Similarly, if necessary, the program B 0103 performs a data area sharing setting on the unauthorized operation prevention control unit 0106 for sharing the data area with other programs (step S2052), and if necessary, the program C 0107 performs a data area sharing setting on the unauthorized operation prevention control unit 0106 for sharing the data area with other programs (step S2053).

With this step, a plurality of programs can share a protected memory area.

After this, the OS 0104 switches the current program from one to another for operation as necessary (step S2061), and the current program executes the process of the own program (step S2062).

From now on, the program registration process in step S2021, the protection setting process in step S2041, the data area sharing setting process in step S2051, and the program switch process in step S2061 will be described.

Figure 10:
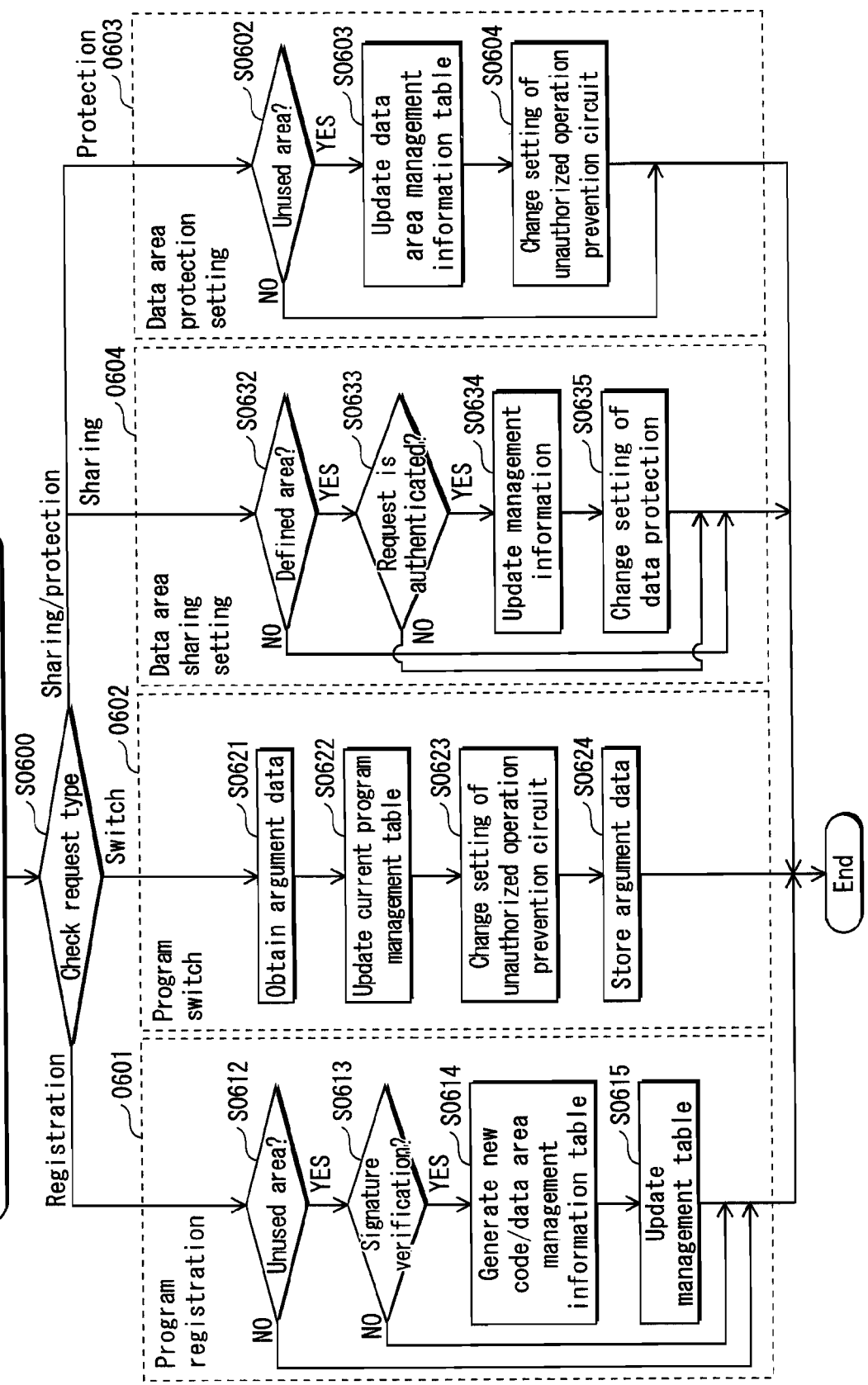
FIG. 10 is a flowchart showing the unauthorized operation prevention control process.
Figure 12:
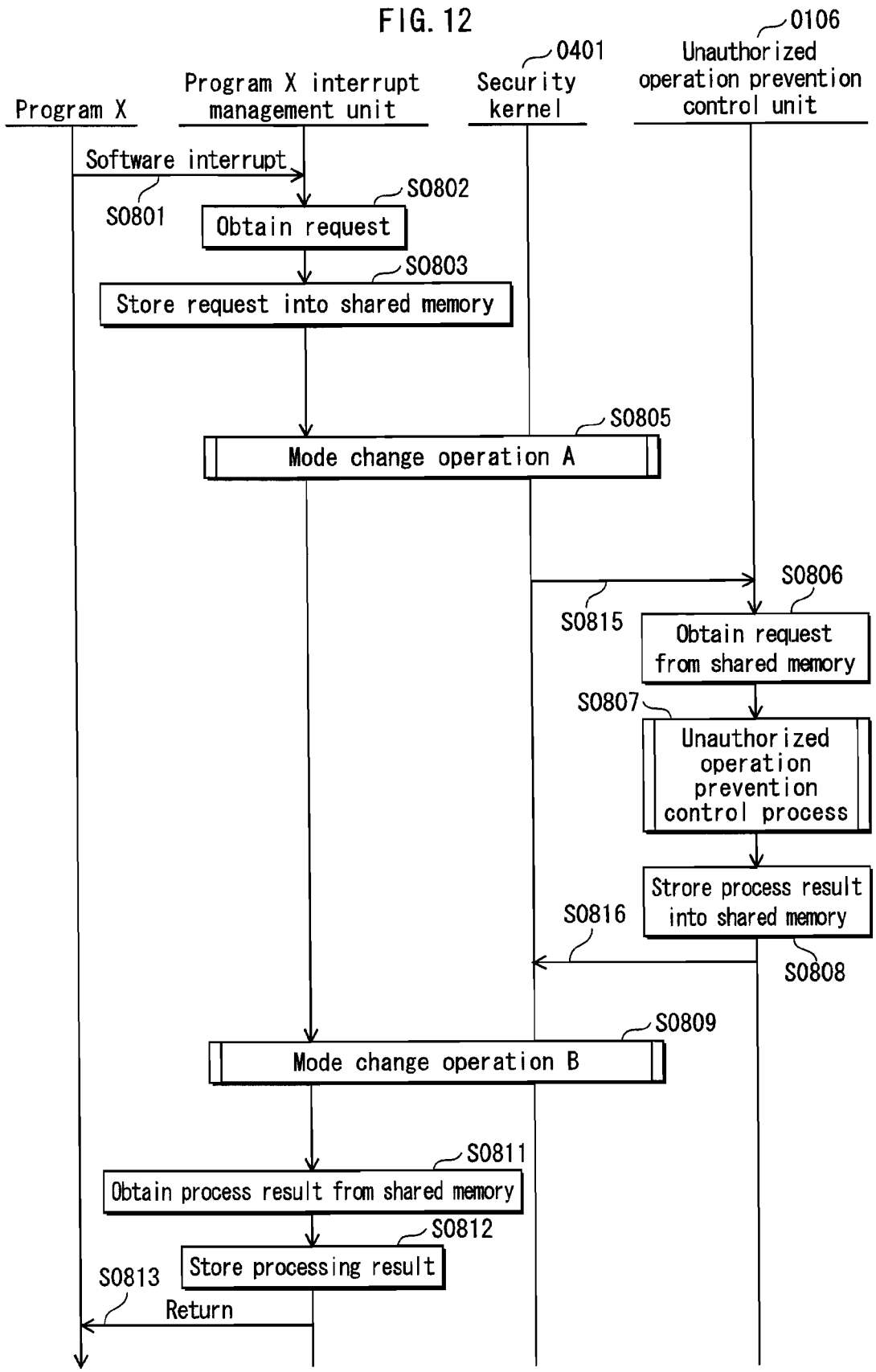
FIG. 12 is a flowchart showing the process performed by the unauthorized operation prevention control process in response to the request from the program X.

The above-described steps S2020, S2021, S2022, S2023, S2040, S2041, S2042, S2043, S2051, S2052, and S2053 are all executed in accordance with the basic process flow shown in FIGS. 10-12.

In the following, step S2021 will be described as an example of steps S2020 to S2023, step S2041 will be described as an example of steps S2040 to S2043, and step S2051 will be described as an example of steps S2051 to S2053.

It should be noted here that the execution of each process of steps S2021 to S2053 is not limited to once, but may be executed more as necessary.

<3.1. Program Registration Process>

Figure 21:
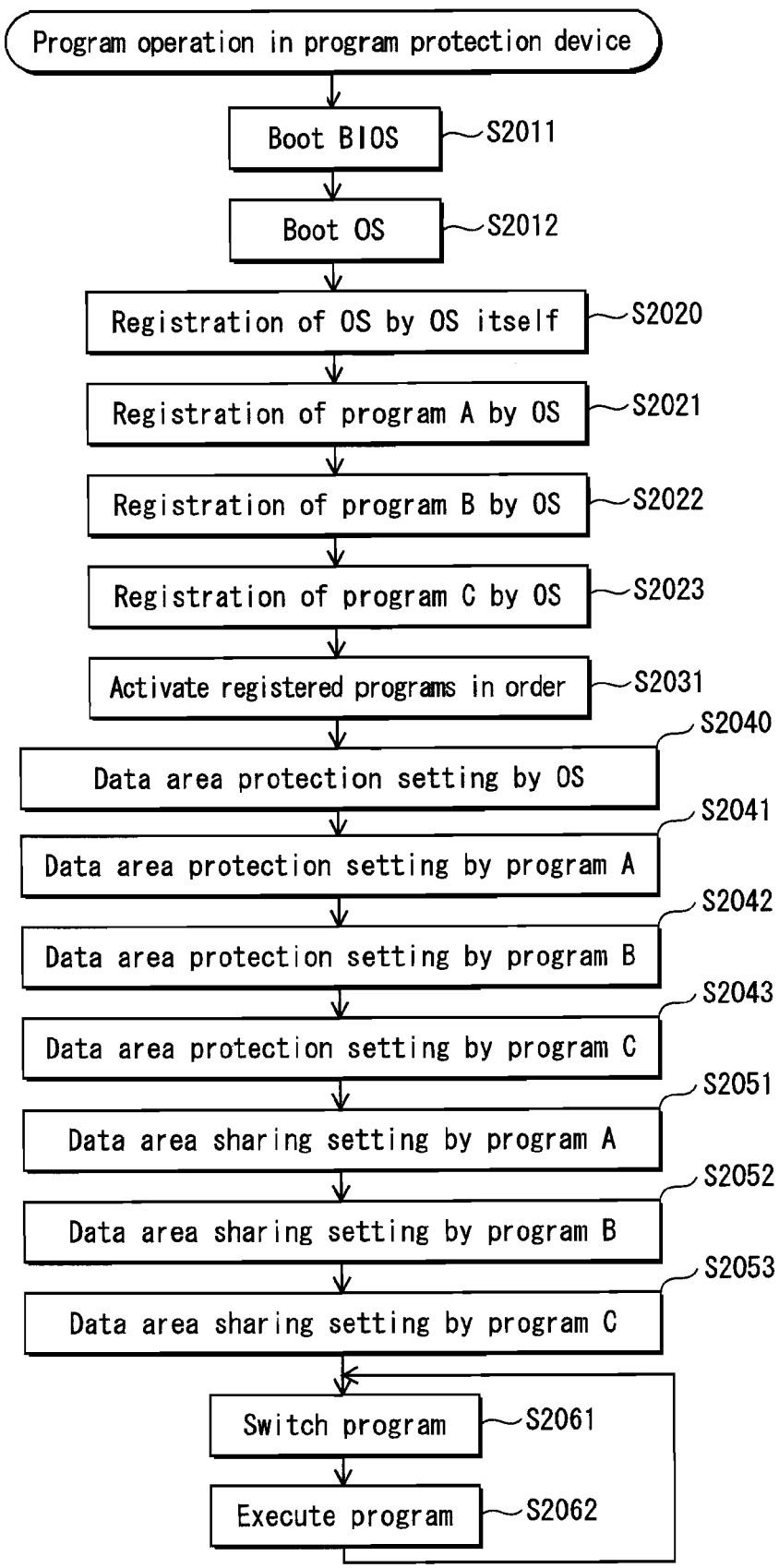
FIG. 21 is a flowchart showing the operation of the program in the program protection device.

In step S2021 shown in FIG. 21, the OS 0104 registers information of the program A with the unauthorized operation prevention control unit 0106.

The program X shown in FIGS. 11 and 12 is a program that operates in accordance with the flowchart. In the present embodiment, the program X is any of the program A 0102, the program B 0103, the program C 0107, and the OS 0104. Here, it is presumed that the program X is the OS 0104 and the program X interrupt management unit is the OS interrupt management unit 0404, and that the OS 0104 requests a registration of the program A.

First, the program X writes a registration request for registering the program A, into the data area on the RAM 0202, which has been specified preliminarily for the program X.

The registration request includes, as shown in FIG. 5, a key (for encrypting code) that was used when code of the program A being the registration target was encrypted, signature data for the program, and a function flag.

The key has been encrypted with a public key encryption algorithm, and a secret key corresponding to a public key that was used to encrypt the key is stored in the unauthorized operation prevention control unit 0106.

The secret key is provided with a countermeasure so as not to be leaked to outside the unauthorized operation prevention control unit 0106.

The signature data for the program is used to verify the authenticity and completeness of the program.

The load address information of the program indicates an address area in which the program to be registered is loaded.

The program X causes a software interrupt to occur, due to the registration request for registering the program A (step S0801), and hands the control to the program X interrupt management unit.

Next, the program X interrupt management unit investigates a contributing factor of the software interrupt caused by the program X to occur, reads the registration request from the predetermined data area, and detects the interrupt type (step S0802). In the present example, the program X interrupt management unit confirms that the interrupt type is a software interrupt due to the registration request for registering the program A.

Next, the program X interrupt management unit stores the registration request into a shared memory (step S0803).

Here, the shared memory is a predetermined memory area in the RAM 0202 that is used in communications in the normal mode and the protected mode.

At this point in time, the mode change operation A is executed to switch the operation mode of the program protection device 0101 from the normal mode to the protected mode.

Here, the mode change operation A will be described with reference to FIG. 11A.

In the present example, the program X is the OS 0104.

The program X interrupt management unit requests the mode switch circuit 0208 to switch the mode to the protected mode (step S1700).

The mode switch circuit 0208 stores the internal status of the CPU into the predetermined data area in the RAM 0202 managed by the program X (step S1701).

The mode switch circuit 0208 saves the context of the program X, which is the request source of the mode switch request, into a predetermined area in the RAM 0202 that has been preliminarily assigned to the program X.

The mode switch circuit 0208 outputs the mode signal A 0211 indicating the protected mode and invalidates the debugger interface 0209 (step S1702).

Next, the mode switch circuit 0208 clears the CPU internal status (step S1703).

Next, the mode switch circuit 0208 outputs the mode signal B 0217 indicating the protected mode and changes the setting of the key register 0205 (step S1704).

Here, the key register 0205 makes the instruction key information table 0305 and the data key information table 0306 changeable by using the setting signal 0304 that is notified via the bus 0210.

Next, the mode switch circuit 0208 outputs the mode signal C 0218 indicating the protected mode and changes the setting of the access restriction circuit 0207 (step S1705), and the access restriction circuit 0207 establishes an open state for the bus 0210 to access the protected memory 0206.

It should be noted here that in the open state, an access from the bus 0210 to the protected memory 0206 is permitted.

Next, the mode switch circuit 0208 changes the setting of the vector table 0219 so that the CPU 0201 executes a handler within the security kernel 0401 when an interrupt or exception occurs (step S1706).

The mode switch circuit 0208 restores the context, which was stored in the protected memory 0206 immediately before the mode was switched from the normal mode to the protected mode, onto the CPU (step S1707).

Next, the mode switch circuit 0208 hands the control to the security kernel 0401 (step S1708). The program protection device 0101 enters into the protected mode, and the mode switch operation A ends.

Next, the security kernel 0401 hands the control to the unauthorized operation prevention control unit 0106 (step S0815).

Next, the unauthorized operation prevention control unit 0106 obtains the request from the shared memory (step S0806). Here, the request is the registration request.

Next, the unauthorized operation prevention control unit 0106 executes the unauthorized operation prevention control process (step S0807).

Here, the unauthorized operation prevention control process (step S0807), in the case where the request is the registration request, will be described in detail with reference to FIG. 10.

The unauthorized operation prevention control unit 0106 checks the type of the obtained request (step S0600).

In the present example, the obtained request is the registration request ("registration" in step S0600). Accordingly, the control branches to step S0612.

Next, the unauthorized operation prevention control unit 0106 judges whether the code address area, which is indicated by the load address information of the program, is an unused area, using the security requirement management information table T0310 and the program management information table T0410 (step S0612).

If the code address area is an unused area (YES in step S0612), the unauthorized operation prevention control unit 0106 verifies the signature of the program and the signature of the function flag (step S0613).

If the result of the signature verification is successful (YES in step S0613), the unauthorized operation prevention control unit 0106 generates a new code area management information table and a new data area management information table (step S0614).

Next, the unauthorized operation prevention control unit 0106 updates the program management information table T0410 and the code area management information table, as the update of the management table (step S0615).

In the update of the program management information table T0410, the unauthorized operation prevention control unit 0106 generates a unique program identifier and adds a piece of program management information.

In the update of the code area management information table, the unauthorized operation prevention control unit 0106 decrypts the code encryption key and adds a piece of code area management information.

Next, the unauthorized operation prevention control unit 0106 generates the process result.

The process result includes the program identifier that was generated when the management table was updated (step S0615). If the code address area is not an unused area (NO in step S0612), and if the result of the signature verification is unsuccessful (NO in step S0613), the unauthorized operation prevention control unit 0106 includes the cause of the unsuccessful process into the process result. The unauthorized operation prevention control unit 0106 includes the generated process result into the shared memory (step S0808).

Next, the unauthorized operation prevention control unit 0106 hands the control to the security kernel 0401 (step S0816).

Here; the mode switches from the protected mode to the normal mode as the security kernel 0401, the mode switch circuit 0208, and the program X interrupt management unit execute the mode switch operation B (step S0809).

Now, the mode switch operation B will be described with reference to FIG. 11B.

It is presumed here that the program X is the OS 0104 as described earlier.

The security kernel 0401 requests the mode switch circuit 0208 to switch the mode by outputting the mode signal C 0218 indicating the protected mode (step S1710).

The mode switch circuit 0208 stores the context of the CPU into the protected memory 0206 (step S0817).

Upon receiving the mode signal C 0218, the access restriction circuit 0207 brings the access from the bus 0210 to the protected memory 0206 into the shut status.

It should be noted here that, in the shut status, an access from the bus 0210 to the protected memory 0206 is not available.

The mode switch circuit 0208 controls the mode signal B 0217 to change the setting of the key register 0205 (step S1713).

Here, the key register 0205 makes the instruction key information table 0305 and the data key information table 0306 unchangeable by using the setting signal 0304 that is notified via the bus 0210.

The mode switch circuit 0208 clears the CPU internal status (step S1714).

The mode switch circuit 0208 changes the setting of the vector table 0219 so that the CPU 0201 executes a handler included in the program X interrupt management unit when an interrupt or exception occurs (step S1715).

The vector table 0219 is set so that handlers included in each interrupt management unit can be executed. Here, the unauthorized operation prevention control unit 0106 can specify, to the mode switch circuit 0208, an interrupt management unit that includes a handler to be executed.

The mode switch circuit 0208 outputs the mode signal B 0217 indicating the protected mode and changes the setting of the key register 0205 (step S1704).

Next, the mode switch circuit 0208 validates the debugger interface 0209 by controlling the mode signal A 0211 (step S1716).

It should be noted here that if the unauthorized operation prevention control unit 0106 has preliminarily instructed the mode switch circuit 0208 not to validate the debugger interface 0209, the mode switch circuit 0208 skips step S1716 and does not validate the debugger interface 0209.

The mode switch circuit 0208 restores the context of the program X (step S1717), then hands the control to the program X interrupt management unit (step S1718). The program protection device 0101 enters the normal mode, and the mode switch operation B ends.

Next, the program X interrupt management unit obtains the process result from the shared memory (step S0811).

Then, the program X interrupt management unit stores the process result into the data area that is managed by the program X (step S0812), and then returns to the process from the software interrupt (step S0813).

<3.2 Data Area Protection Setting Process>

Step S2041 in FIG. 21 is a process in which the program A requests the unauthorized operation prevention control unit 0106 to set the memory area to be protected for use.

The following description will center on the differences from the above-described program registration process.

It is presumed here that the program X is the program A 0102.

The program X writes a data area protection setting request, which includes a data address and security requirement, onto the shared memory that is a data area on the RAM 0202 that has been specified preliminarily for the program itself.

The data address includes the start and end addresses of the memory area that is requested by the program X to be used as a data area.

The security requirement is a protection attribute that is desired by the program X to be set to the data to be stored in the data address, and has the same data structure as the security requirement list 0109. For example, the security requirement is five-bit data, where the five bits respectively indicate whether or not the functions: file output; copy; move; special playback; and digital output can be executed. It should be noted here that the security requirement may be the security requirement list 0109.

The unauthorized operation prevention control unit 0106 obtains the data area protection setting request in step S0802.

Steps S0803 to S0806 are the same as those in the program registration process.

In the judgment performed in step S0600 shown in FIG. 10, which is a detail of step S0807, the unauthorized operation prevention control unit 0106 judges that the above-described process request is the data area protection setting request ("protection" in step S0600). Accordingly, the control moves to step S0602.

The unauthorized operation prevention control unit 0106 judges whether the data address included in the data area protection setting request has been registered with the security requirement management information table T0310, as the security requirement management information (step S0602). The unauthorized operation prevention control unit 0106 judges that the area at the data address is an unused area if the data address has not been registered, and judges that the area at the data address is not an unused area if the data address has been registered.

If the area at the data address is an unused area (YES in step S0602), the security requirement management information table T0310 and the data area management information table set 0501 are updated (step S0603).

In updating the security requirement management information table T0310, the unauthorized operation prevention control unit 0106 adds a new piece of security requirement management information, which includes data address composed of the above-described start and end addresses, to the data area management information table that corresponds to the request source program.

The unauthorized operation prevention control unit 0106 generates a random number and registers the generated random number as the data encryption key in the new piece of security requirement management information.

Next, the unauthorized operation prevention control unit 0106 sets the updated information of the data area management information table in the unauthorized operation prevention circuit 0105 (step S0604).

More specifically, the unauthorized operation prevention control unit 0106, as the setting of the updated information in the unauthorized operation prevention circuit 0105, adds a pair of the data address of the new piece of security requirement management information and the data encryption key to the data key information table 0306 of the unauthorized operation prevention circuit 0105.

If the area at the received data address has already been allocated to another program (NO in step S0602), the unauthorized operation prevention control unit 0106 moves to step S0808, skipping the updating of the management table (step S0603) and changing of the data area setting (step S0604).

The unauthorized operation prevention control unit 0106 stores the process result into the shared memory (step S0808).

The process results include a normal end, a contributing factor of an error that the area at the data address has been allocated to another program, and the like.

The steps succeeding to this are the same as those in the above-described program registration process.

<3.3 Data Area Sharing Setting Process>

Step S2051 in FIG. 21 is a process in which the program A requests the unauthorized operation prevention control unit 0106 to set the memory area to be shared for use.

The following description will center on the differences from the above-described program registration process. It is presumed here that the program X is the program A 0102.

The program X writes the signature A 0115 and a data area sharing setting request, which includes a data address and security requirement, onto the shared memory that is a data area on the RAM 0202 that has been specified preliminarily for the program itself.

The data address includes the start and end addresses of the memory area that is requested by the program X to be shared as a data area. The security requirement includes information of the function flag A 0111 of the file A 0212.

The signature A 0115 is used by the unauthorized operation prevention control unit 0106 to verify the authenticity of the function flag A 0111. The unauthorized operation prevention control unit 0106 obtains the data area sharing setting request in step S0802.

Steps S0803 to S0806 are the same as those in the program registration process.

In the judgment performed in step S0600 shown in FIG. 10, which is a detail of step S0807, the unauthorized operation prevention control unit 0106 judges that the above-described process request is the data area sharing setting request ("sharing" in step S0600).

The unauthorized operation prevention control unit 0106 obtains the data area sharing setting request from the shared memory on the RAM 0202, in step S0802. The unauthorized operation prevention control unit 0106 then judges whether the data address included in the data area sharing setting request has been registered with the security requirement management information table T0310, as the security requirement management information (step S0632). If it judges that the data address has been registered (YES in step S0632), the unauthorized operation prevention control unit 0106 judges whether the data area sharing setting request is authenticated (step S0633).

More specifically, the judgment on the authenticity is made by judging whether the function flag included in the program management information corresponding to the program, which requests for sharing, satisfies the security requirement of the security requirement management information being the target of the judgment on the authenticity.

If it judges that the data area sharing setting request is authenticated (YES in step S0633), the unauthorized operation prevention control unit 0106 updates the security requirement management information table T0310 and the data area management information table for the request source program (step S0634).

In updating the security requirement management information table T0310, the unauthorized operation prevention control unit 0106 writes the identifier of the program, which requests for sharing, into the sharing program identifier of the security requirement management information corresponding to the target data area.

As the identifier of the requesting program, the identifier stored in a current program management table 0503 is used.

If the security requirement specified by the requesting program is stricter than the existent security requirement, the security requirement specified by the requesting program is added as a security requirement of the security requirement management information corresponding to the target data area.

It should be noted here that the case where the security requirement specified by the requesting program is stricter than the existent security requirement means the case where the number of security requirements is larger than the number of existent security requirements, since the security requirement has the same data structure as the security requirement list 0109.

Further, in updating the data area management information table, the unauthorized operation prevention control unit 0106 adds the data area management information to the data area management information table for the request source program.

Here, the requested address area is set to the data address of the added data area management information, and the encryption key used in encrypting/decrypting the data area, which is the target of sharing, is set to the data encryption key thereof.

Next, the unauthorized operation prevention control unit 0106 changes the data protection setting (step S0635).

More specifically, the unauthorized operation prevention control unit 0106 reflects the contents of the data area management information table after the update in step S0634 onto the unauthorized operation prevention circuit 0105, and generates a process result indicating a normal end.

If it judges that the data address has not been registered (NO in step S0632), or if it judges that the data area sharing setting request is not authenticated (NO in step S0633), the unauthorized operation prevention control unit 0106 generates a process result indicating an error.

Next, the unauthorized operation prevention control unit 0106 stores the generated process result into the shared memory (step S0808).

The process results include a normal end, a contributing factor of an error that the area at the data address has been allocated to another program, and the like.

The steps succeeding to this are the same as those in the above-described program registration process.

<3.4 Program Switching Process>

Step S2061 in FIG. 21 is a process that is performed when the program A 0102 requests the unauthorized operation prevention control unit 0106 to switch the current program to another.

The following description will center on the differences from the above-described program registration process.

It is presumed here that the program X is the program A 0102, and that the program A 0102 requests that the program itself switches to the program B 0103.

The program X writes a switch request and argument data, which is to be transferred to the program to be switched to, onto the shared memory that is a data area on the RAM 0202 that has been specified preliminarily for the program itself, where the switch request includes an identifier of the program to be switched to.

The program X interrupt management unit obtains the program switch request in step S0802.

Steps S0803 to S0806 are the same as those in the program registration process.

In the judgment performed in step S0600 shown in FIG. 10, which is a detail of step S0807, the unauthorized operation prevention control unit 0106 judges that the process request is the program switch request ("switch" in step S0600).

The unauthorized operation prevention control unit 0106 obtains the switch request from the RAM 0202 in step S0802, and obtains the argument data (step S0621). The argument data is information that is transferred from the switch source program to the switch destination program, and includes a command or the like.

The unauthorized operation prevention control unit 0106 stores the obtained argument data into the protected memory 0206.

In the RAM 0202, the storage location of the argument data is preliminarily determined, and the unauthorized operation prevention control unit 0106 preliminarily recognizes the storage location.

It should be noted here that the storage location of the argument data need not be fixed, but may be specified by the switch request.

Next, the unauthorized operation prevention control unit 0106 updates the current program management table (step S0622).

Here, the current program management table is updated to contain the identifier of the switch destination program.

Next, the unauthorized operation prevention control unit 0106 changes the setting of the unauthorized operation prevention circuit 0105 (step S0623).

The unauthorized operation prevention control unit 0106 deletes the contents of the instruction key information table and the data key information table stored in the key register 0205, and writes the pairs of a data address and a data encryption key, which are stored in each data area management information in the data area management information table corresponding to the switch destination program in the data area management information table set 0501, into the data key table for the unauthorized operation prevention circuit 0105.

The unauthorized operation prevention control unit 0106 also writes the pairs of a data address and a code encryption key, which are stored in each code area management information in the code area management information table corresponding to the switch destination program in the code area management information table set 0502, into the instruction key information table 0305 for the unauthorized operation prevention circuit 0105.

Next, the unauthorized operation prevention control unit 0106 stores the argument data, which has preliminarily been stored in the protected memory 0206, into the RAM 0202 that is managed by the switch destination program (step S0624).

Next, the unauthorized operation prevention control unit 0106 generates a process result including an instruction to branch to the switch destination program, and stores the generated process result into the shared memory (step S0808).

In this way, the unauthorized operation prevention control unit 0106 can transfer the argument data to another program via the protected memory.

With this structure, if it receives a request from a program such as the OS 0104 to transfer data to another program, the unauthorized operation prevention control unit 0106 can transfer the data such that the data does not leak to programs other than the request source program and the request destination program.

For example, when the program A 0102 calls the program B 0103 as a function while the program B 0103 does not share the data area of the program A 0102, it is possible to transfer the argument data safely.

Further, when the program A 0102 call the system call of the OS 0104, it is possible to transfer the argument data safely.

4. Overall Operation

The overall operation will be described with reference to the flowchart shown in FIGS. 13 and 14, using the program switch process (for switching from the program A 0102 to the program B 0103) performed by the program protection device 0101, as an example.

After decrypting the content being the protection target data 0108, the program A 0102 writes a process request containing argument data for the program B into the data area, which has been preliminarily allocated to the program A 0102, to request for playing back the decrypted content, and causes a software interrupt to occur so that the program switches to the program B 0103, and hands the control to the program A interrupt management unit 0402 (step S0901).

The program A interrupt management unit 0402 obtains the argument data from the data area, and confirms that the interrupt type is a software interrupt for switching to the program B 0103 (step S0902).

Next, the program A interrupt management unit 0402 stores the argument data and the request for switching to the program B 0103, into the shared memory (step S0903).

Next, the program A interrupt management unit 0402, the mode switch circuit 0208, and the security kernel 0401 execute the mode switch operation A to switch the mode from the normal mode to the protected mode (step S0905).

Next, the security kernel 0401, which has become the main controller in step S0905, hands the control to the unauthorized operation prevention control unit 0106 (step S0907).

Next, the unauthorized operation prevention control unit 0106 obtains the request and argument data, which were stored in step S0903, from the shared memory (step S0908).

Next, the unauthorized operation prevention control unit 0106 judges that the program switching process needs to be performed, from the fact that the above-described request is a request for switching to the program B 0103, and performs the program switching process 0602 (step S0909).

The unauthorized operation prevention control unit 0106 stores the result of the program switching process into the shared memory (step S0910).

The unauthorized operation prevention control unit 0106 then hands the control to the security kernel (step S0911).

Here, the security kernel 0401, the mode switch circuit 0208, and the OS interrupt management unit 0404 execute the mode switch operation B to switch the mode from the protected mode to the normal mode (step S0913). Also, since the program switching requires a process by the operating system, the control is moved to the OS interrupt management unit 0404 after the mode returns to the normal mode.

Next, the OS interrupt management unit 0404 obtains the process result from the shared memory (step S0915), and hands the control to the OS 0104 (step S0916).

Next, the OS 0104 performs the process for switching the program from the program A 0102 to the program B 0103 (step S0917). Here, the OS 0104 switches the program context or the like from one to another.

The OS 0104 hands the control to the OS interrupt management unit 0404 in order to request the unauthorized operation prevention control unit 0106 to cause the program to switch to the program B 0103 (step S0918).

Next, the OS interrupt management unit 0404 stores the request for switching to the program B 0103 into the shared memory (step S0919).

Steps S0921 to S0929 are the same as steps S0905 to S0913, and the description thereof is omitted.

Here, however, since the switch destination program is the program B 0103, not the OS 0104, the control moves to the program B interrupt management unit 0403.

Next, the program B interrupt management unit 0403 obtains the process result from the shared memory (step S0931).

The program B interrupt management unit 0403 stores the process result into the data area managed by the program B 0103 (step S0933), and then returns to the process from the software interrupt (step S0933).

After this, the program B 0103 processes the data (step S0934).

5. Supplementary Description Using Content Decryption Process as Example

Provided here is a supplementary description regarding a case where, in the program protection device 0101, the program A 0102 decrypts the protection target data 0108 being an encrypted content and the program B is a player for playing back the decrypted content, and the program A 0102 and the program B operate in cooperation, with reference to FIGS. 15-20, centering on the change of data.

Also provided is a description of an operation when the program C 0107, which does not have a right to access the protection target data, tries to access the protection target data.

Figure 16:
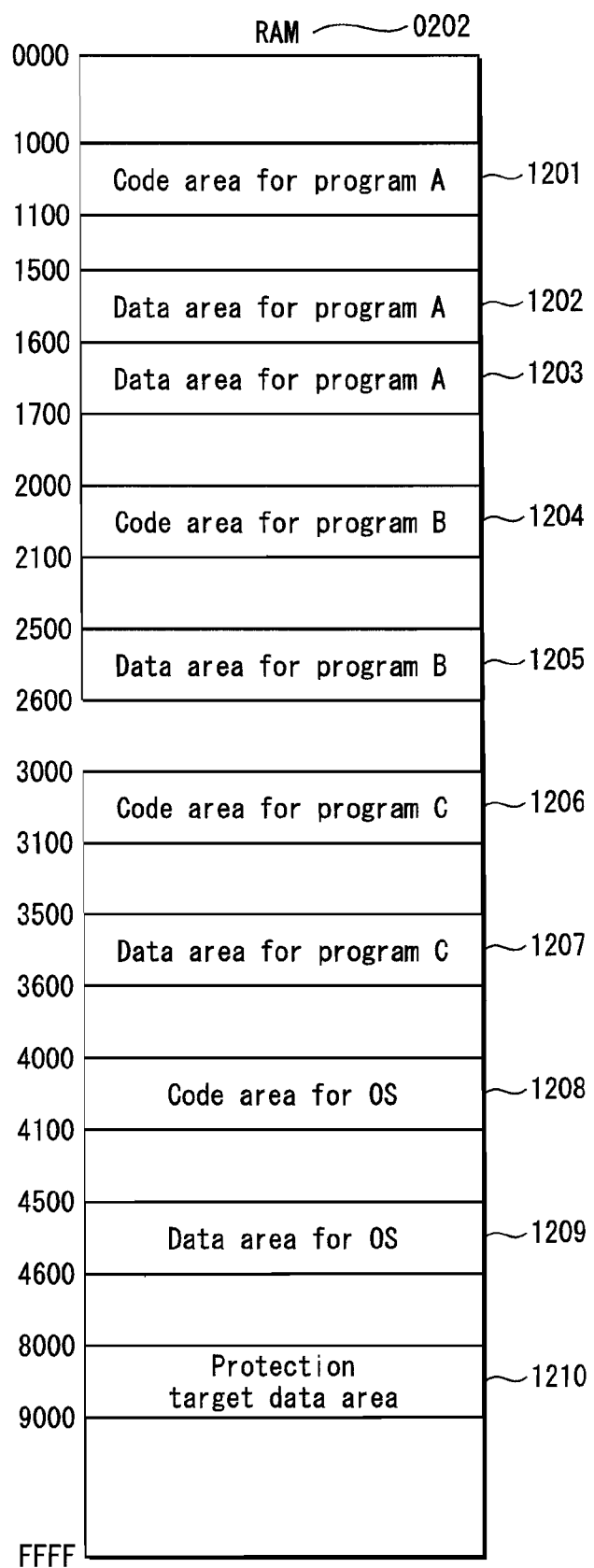
FIG. 16 shows the status of the RAM being operating in the program protection device.

FIG. 16 shows the status of the RAM 0202 being operating in the program protection device 0101.

Codes of the program A 0102, the program B 0103, the program C 0107, and the OS 0104 are encrypted using the code encryption keys KC_A, KC_B, KC_C, and KC_OS respectively, and are stored into the nonvolatile memory 0203.

The BIOS 0405 stored in the nonvolatile memory 0203 loads the file A 0212, the file B 0213, the file C 0214, and the file OS 0215 onto the RAM 0202.

As a result of this, the code area (including a constant) 1201 for the program A 0102 is loaded into an area at addresses 1000-1100.

Similarly, code areas for the program B 0103, the program C0107, and the OS 0104 are loaded into areas at addresses 2000-2100, 3000-3100, and 4000-4100, respectively.

Further, the protection target data 0108 stored in the storage medium 0216 is loaded into a protection target data area 1210 that is at addresses 8000-9000.

It should be noted here that the protection target data 0108 may not necessarily be loaded by the BIOS 0405, but may be loaded by any other program.

After this, the BIOS 0405 requests the unauthorized operation prevention control unit 0106 to register the program.

The unauthorized operation prevention control unit 0106 registers each program in accordance with a program registration process 0601.

As a result of this generated in the management table 0110 are data area management information tables T0500, T0600, T0700, and T0800, code area management information tables T0900, T1000, T1100, and T1200, program management information table T1300, and security requirement management information table T1400, as shown in FIGS. 17-19.

In the present example, the BIOS 0405 loads/registers the program A 0102, the program B 0103, and the program C 0107. However, after the BIOS 0405 loads/registers only the OS 0104, the OS 0104 may load/register the program A 0102, the program B 0103, and the program C 0107.

In the update of the management table (step S0615) in the program registration process 0601, the program management information T1301-T1304 are added to the program management information table T1300.

The function flag A 0111 and the function flag B 0112 of the program A 0102 and the program B 0103 indicate that the programs do not have the file output function. Accordingly, the "function flag" field of the program management information T1301 and T1302 indicates that the file output function is not available.

The functions other than the file output function are treated in the same manner as the file output function.

In the update of the management table (step S0615) in the program registration process 0601, the code area management information T0901 and T0902 are added to the code area management information table T0900.

In the code area management information T0901 in the present example, the code area identifier is set to "A_CO", the code address is set to "1000-1099", and the code encryption key is set to "KC_A".

Here, the unauthorized operation prevention control unit 0106 decrypts a code encryption key 0710 stored in the file A 0212, using the secret key.

In the code area management information T0902 in the present example, the code area identifier is set to "undefined area", the code address is set to "other than defined area", and the code encryption key is set to "KC_RA".

Here, "other than defined area" indicates areas other than the code address areas defined in the code area management information registered with the code area management information table T0900 other than the code area management information T0902. The code encryption key "KC_RA" is used for the areas other than the defined areas.

The code encryption key "KC_RA" is a random number generated by the unauthorized operation prevention control unit 0106. The other code area management information tables T1000, T1100, and T1200 are set in a similar manner, as shown in FIG. 16.

Figure 15:
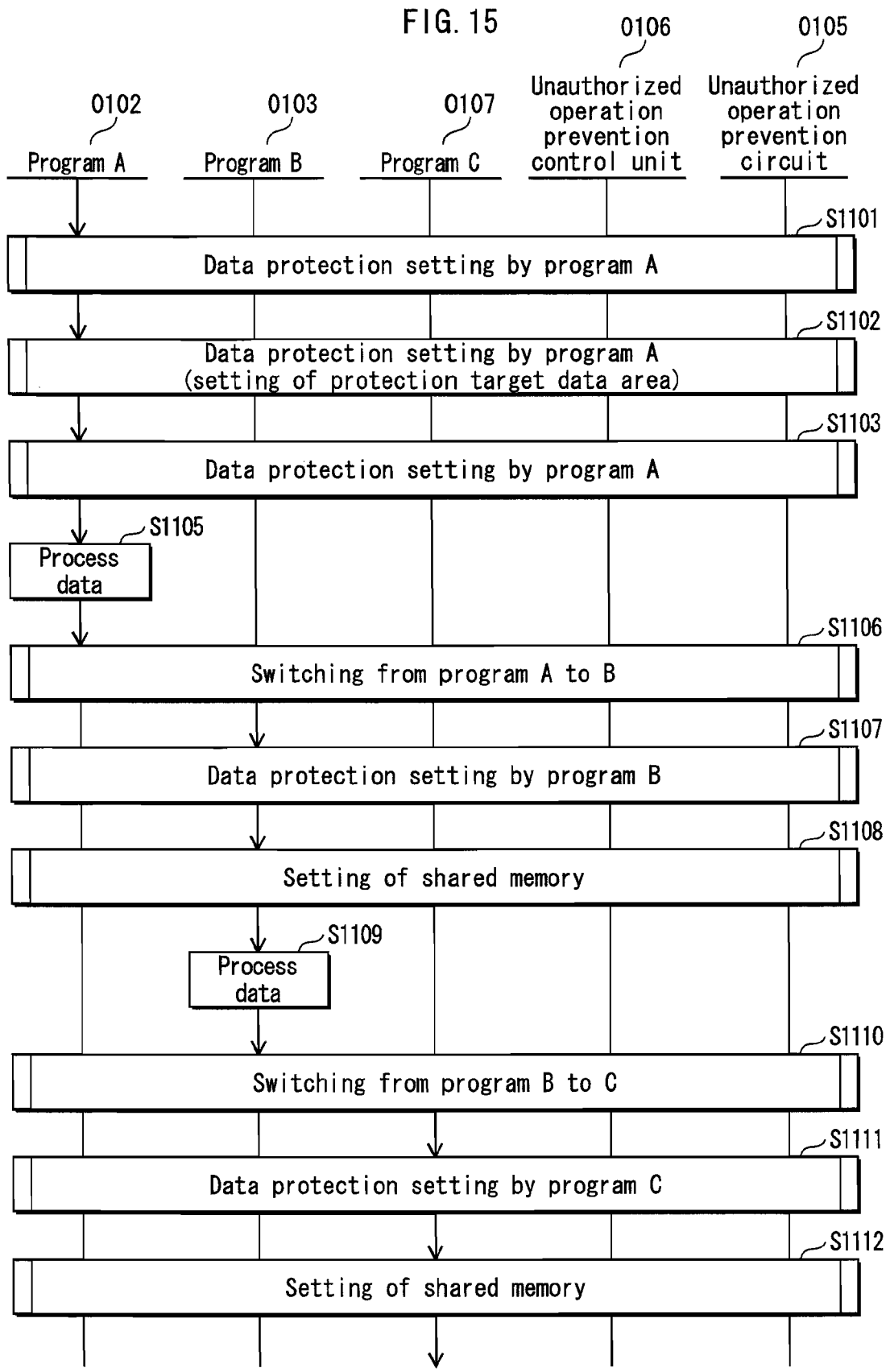
FIG. 15 is a flowchart showing the operation of the program protection device.

FIG. 15 is a flowchart showing the operation of the program protection device 0101.

This flowchart shows a case where the programs A-C operate in cooperation, and the program C stops since it does not meet the security requirement.

In FIG. 15, the operation of the interrupt management units 0402, 0403, 0404, and 0406 is not shown. Now, the operation of the program protection device 0101 will be described with reference to FIG. 15.

The program A 0102 requests the unauthorized operation prevention control unit 0106 to perform the data protection setting so as to make a data area 1202 for the program A usable (step S1101).

Here, the program A 0102 requests the unauthorized operation prevention control unit 0106 to secure an area at addresses 1500-1599 as the data area such that the data area can be accessed only by the program A 0102.

The program A 0102 performs the same operation as in steps S0801-S0813 as the data protection setting.

It is presumed here that the request for the data protection setting is performed in a similar manner.

As a result of this, data area management information T0501 is added to the data area management information table T0500 for the program A, and security requirement management information T1401 is added to the security requirement management information table T1400.

Here, in the unauthorized operation prevention control process (step S0807), the unauthorized operation prevention control unit 0106 performs data area protection setting process 0603.

The data encryption key DK_A1 for the data area management information T0501 is a random number generated by the unauthorized operation prevention control unit.

Next, the program A 0102 performs the setting so that the data in the protection target data area 1210 can be used (step S1102).

The data 0701 in the protection target data 0108 stored in the protection target data area 1210 has been encrypted using the data encryption key 0702. Accordingly, the program A 0102 cannot use the data 0701 unless the data 0701 is decrypted using the data encryption key 0702.

It is presumed here that the decryption is performed by the bus encryption circuit 0204.

For this, the program A 0102 requests the unauthorized operation prevention control unit 0106 to perform the data area setting.

The data area setting request includes the address of the protection target data area 1210 and the security requirement.

Here, the program A 0102 instructs the unauthorized operation prevention control unit 0106 to use the security requirement list 0109, which is included in the protection target data 0108, as the security requirement.

The unauthorized operation prevention control unit 0106 performs steps S0801 through S0803 shown in FIG. 12.

In the unauthorized operation prevention control process (step S0807), the unauthorized operation prevention control unit 0106 performs a process in the same way as the data area protection setting process 0603.

Figure 20:
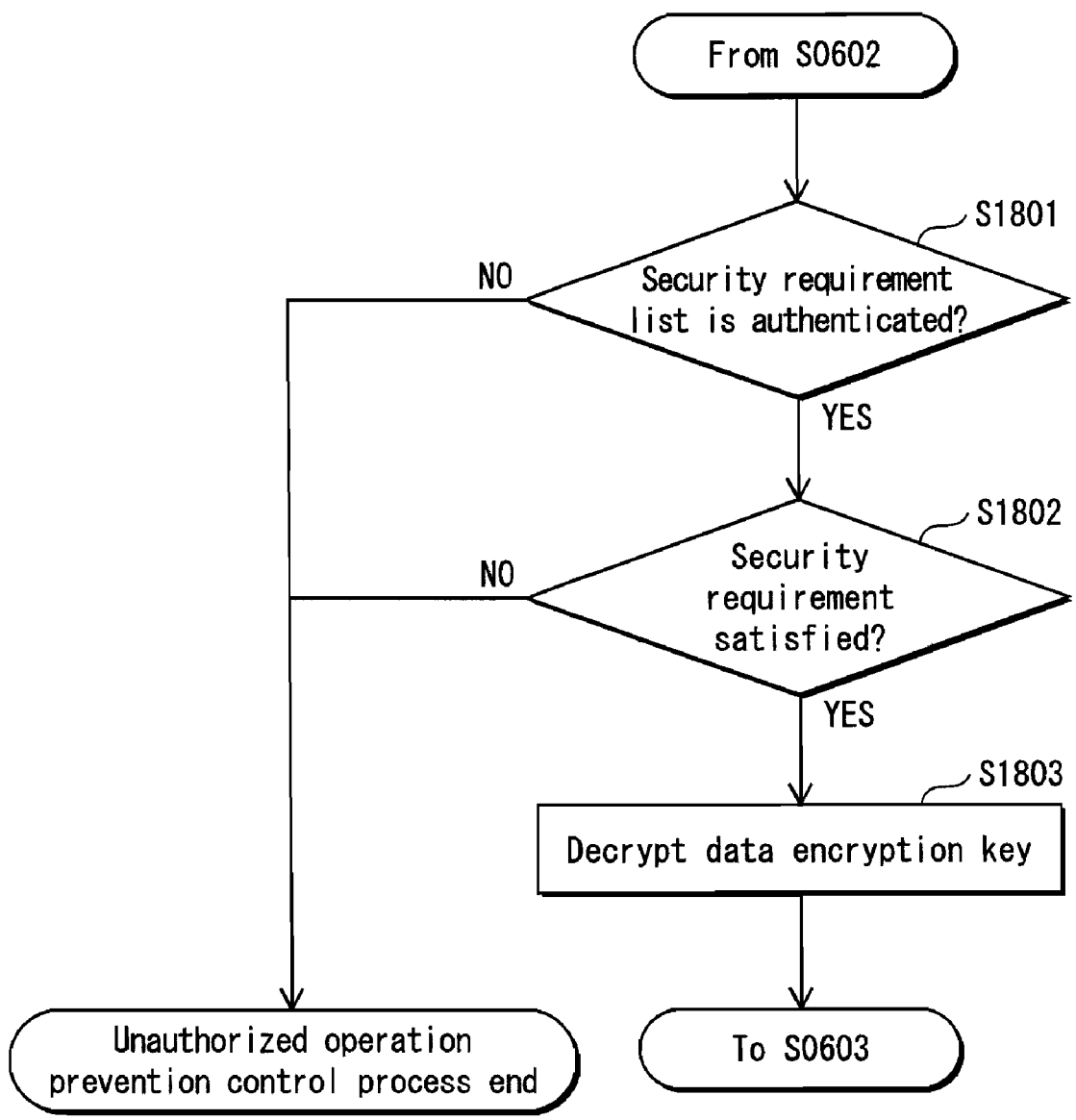
FIG. 20 is a flowchart showing the process of judging whether or not the function flag of the program satisfies the security requirement.

However, an additional process is performed immediately after the judgment on whether the data address is an unused area (step S0602). That is to say, after step S0602, the process shown in the flowchart of FIG. 20 is performed to confirm whether or not the function flag for the program A satisfies the security requirement described in the security requirement list 0109 for the protection target data 0108.

If the function flag does not satisfy the security requirement, the unauthorized operation prevention control process is ended.

Here, in the confirmation on whether or not the function flag satisfies the security requirement, the unauthorized operation prevention control unit 0106 first confirms whether or not the security requirement list is authenticated (step S1801).

If it is judged that the security requirement list is not authenticated (NO in step S1801), the unauthorized operation prevention control process is ended.

Here, the unauthorized operation prevention control unit 0106 checks whether the security requirement list 0109 is authenticated, using the signature data 0708.

Next, the unauthorized operation prevention control unit 0106 compares the security requirement with the function flag (step S1802).

Here, the unauthorized operation prevention control unit 0106 compares the security requirement list 0109, whose authenticity has already been confirmed, with the function flag for the program A that is contained in the T1301, and confirms whether or not the security requirement is satisfied, and confirms whether or not the security requirement of the security requirement management information, which is included in the security requirement management information table T1400, that has been generated by the program A satisfies the security requirement list 0109.

If it is judged that the security requirement is not satisfied (NO in step S1802), the unauthorized operation prevention control process is ended.

Further, it is confirmed whether or not the security requirements for the other data areas included in the security requirement management information table T1400 satisfy the security requirement list 0109. This prevents data from being leaked from a data area that does not satisfy the security requirement for the protection target data 0108.

The unauthorized operation prevention control unit 0106 then decrypts the data encryption key 0702 (step S1803), and updates the data area management information table (step S0603).

Here, the unauthorized operation prevention control unit 0106 adds the data area management information T0502 to the data area management information tables T0500, and adds the security requirement management information T1402 to the security requirement management information table T1400.

The data encryption key 0702 is stored in the "data encryption key" field in the data area management information T0502.

In FIG. 17, the data encryption key 0702 is represented as "KD_S".

Next, the program A 0102 requests the unauthorized operation prevention control unit 0106 to secure an area at addresses 1600-1699 as the data area by setting the security requirement based on the security requirement list 0109 (step S1103).

Here, the security requirement list 0109 includes information indicating that the file output of the protection target data 0108 is not available.

Here, the unauthorized operation prevention control unit 0106 confirms, using the security requirement management information table T1400, whether or not the requested security requirement is equal to or stricter than the security requirement for each data area that has already been generated by the program A 0102.

If it is judged that the requested security requirement is neither equal to nor stricter than the security requirement for each data area that has already been generated, the management information is not added.

If it is judged that the requested security requirement is equal to or stricter than the security requirement for each data area that has already been generated, the unauthorized operation prevention control unit 0106 adds the data area management information T0503 to the data area management information tables T0500, and adds the security requirement management information T1403 to the security requirement management information table T1400.

The program A 0102 then reads the protection target data 0108 from the protection target data area 1210, and processes the protection target data 0108 (step S1105).

The process result is stored in a data area 1203 for the program A.

Next, the program A 0102 performs the switch process to switch from the program A 0102 itself to the program B 0103 (step S1106).

Figure 13:
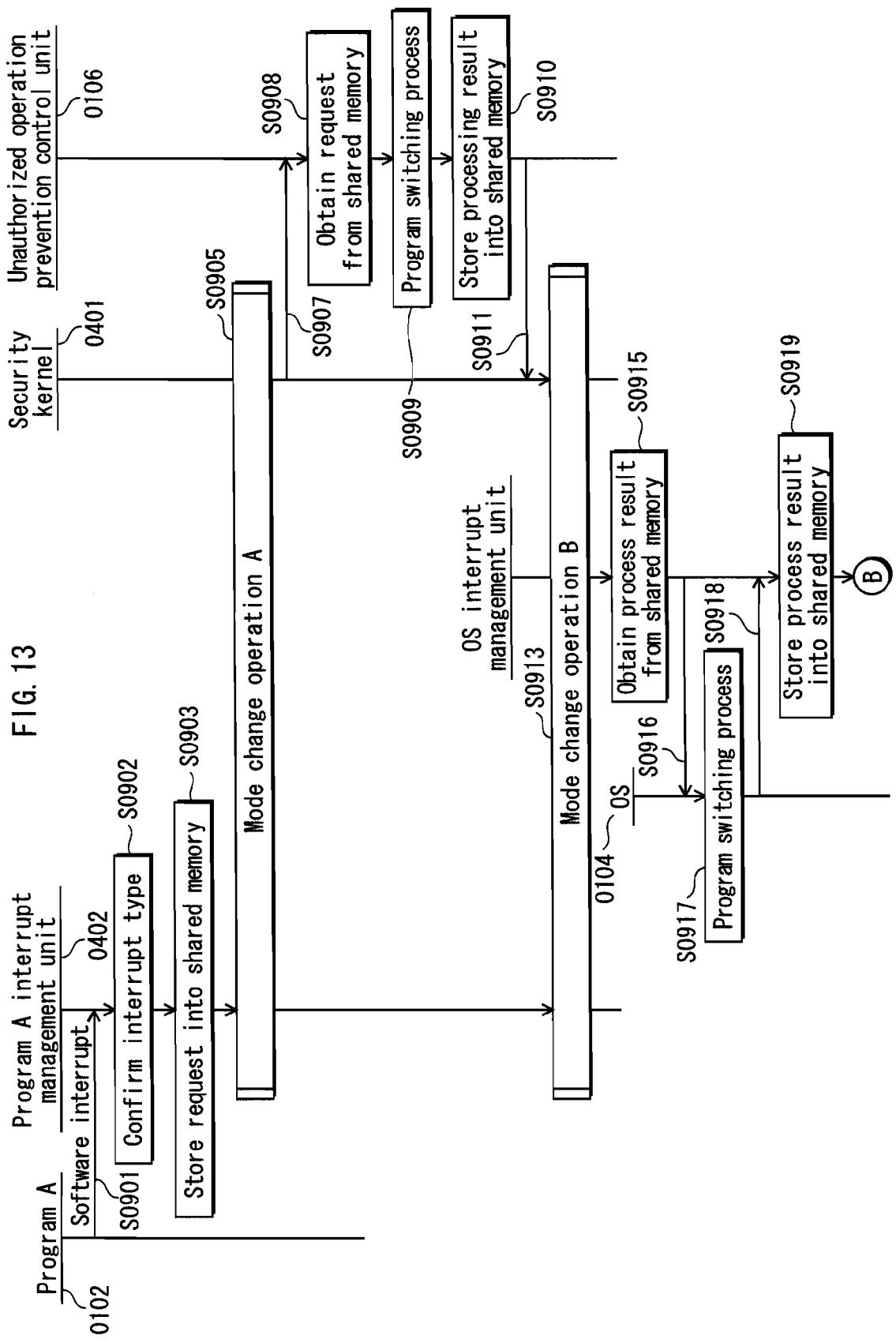
FIG. 13 is a flowchart showing the overall operation of the program.
Figure 14:
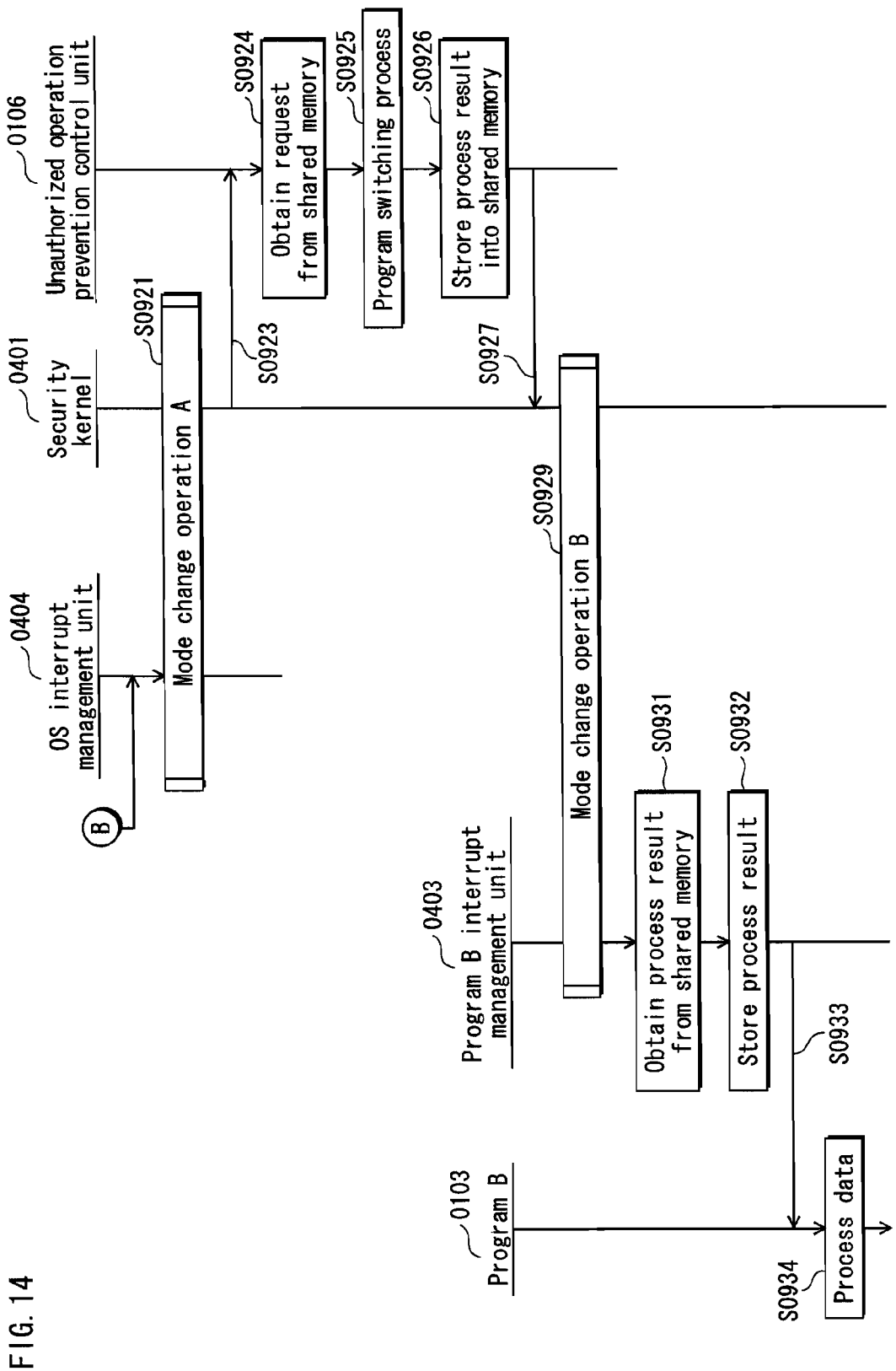
FIG. 14 is a flowchart showing the overall operation of the program (continued from FIG. 13).

Here, the switch process is composed of steps S0901 through S0933 shown in FIGS. 13 and 14.

Before the switch process (step S1106) is started, contents of the code area management information table T0900 and the data area management information table T0500 have been set in the unauthorized operation prevention circuit 0105.

When the switch process (step S1106) starts to be performed, contents of the code area management information table T1000 and the data area management information table T0600 are set in the unauthorized operation prevention circuit 0105.

Here, the contents of each code area management information table is reflected onto the instruction key information table 0305 of the key register 0205 constituting the unauthorized operation prevention circuit 0105, and the contents of each data area management information table is reflected onto the data key information table 0306, so that keys corresponding to the currently operating program can be set in the key registers.

In this way, the program protection device 0101 performs the switch process (step S1106) to cause the program A 0102 to switch to the program B 0103, and changes the key that is used to encrypt/decrypt the area in which the program A 0102 is loaded. This structure prevents the program A 0102 from being executed by the program B 0103 in an unauthenticated manner.

For example, when the program B 0103 is being executed and the control branches from the program B 0103 to the code area 1201 (at addresses 1000-1099) for the program A on the RAM 0202 storing a code that has been encrypted using the code encryption key KC_A, the code in the code area 1201 is decrypted using the code encryption key KC_RB.

If a code having been encrypted using the key KC_A is decrypted using the key KC_RB, the code is not properly decrypted. As a result, the CPU 0201 cannot execute properly. Accordingly, this structure prevents the program A 0102 from being executed by the program B 0103 in an unauthenticated manner.

Similarly, if the data area 1202 for the program A is accessed while the program B 0103 is being executed, meaningful data cannot be obtained therefrom because a corresponding data encryption key is not used.

Also, as the program protection device 0101 performs the switch process (step S1106) to cause the program A 0102 to switch to the program B 0103, a handler contained in the program B interrupt management unit 0403 is executed if an interrupt or exception occurs.

With this structure, the control is not handed to a program other than the program B 0103 if an interrupt or exception occurs.

Next, the program B 0103 requests the unauthorized operation prevention control unit 0106 to perform the data protection setting so as to make a data area 1205 for the program B usable (step S1107).

Here, the program B 0103 requests the unauthorized operation prevention control unit 0106 to secure an area at addresses 2500-2599 as the data area such that the data area can be accessed only by the program B 0103.

As a result of this, data area management information T0601 is added to the data area management information table T0600 for the program B, and security requirement management information T1404 is added to the security requirement management information table T1400.

Next, the program B 0103 performs the data protection setting so as to share the data area 1203 for the program A with the program A (step S1108).

Here, the program B 0103 requests the unauthorized operation prevention control unit 0106 to secure an area at addresses 1600-1699 as the data area 1203, with a security requirement indicating that an output to a file is not available.

At this point in time, the data area 1203 has already been secured by the program A 0102, thus the area is shared by the program A 0102 and the program B 0103.

The program protection device 0101 performs the same process as steps S0801 through S0813 shown in FIG. 12.

Here, in the code/data protection setting (steps S0807), the unauthorized operation prevention control unit 0106 performs a data area sharing setting process 0604 shown in FIG. 10.

In the data area sharing setting process 0604, the unauthorized operation prevention control unit 0106 checks whether or not the requested data area exists in the security requirement management information table T1400 (step S0632).

The unauthorized operation prevention control unit 0106 confirms the existence of the security requirement management information T1403.

Next, the unauthorized operation prevention control unit 0106 checks whether or not the function flag included in the program management information T1302 for program B satisfies the security requirement included in the security requirement management information T1403 of the requested data area.

In the present example, the security requirement of the data area 1203, which is shared by the programs, is that the file output is not available, while the function flag of the program B 0103 indicates that the file output is not available. It is accordingly judged that the function flag of program B satisfies the security requirement of the requested data area.

As a result of this, the identifier of the program B is set to the sharing program identifier included in the security requirement management information T1403.

Here, the security requirement requested by the program B0103 for the data area 1203 is that the file output is not available. Since this is the same as the existent security requirement, the security requirement of the security requirement management information T1403 is not changed.

Next, the management table is updated (step S0634), and the data area management information T0602 is added to the data area management information table T0600 for the program B.

The data encryption key for the current program management table T0503 for the program A is also set to the data encryption key for the data area management information T0602.

Next, the data protection setting is changed (step S0635), and the setting of the key register 0205 is changed.

This enables the program B 0103 to refer to the data area 1203 for the program A.

Next, the program B 0103 performs a process using the data stored in the data area (step S1109).

Next, the program protection device 0101 performs the switch process (step S1110) to cause the program B to switch to the program C.

Next, the program C 0107 requests the unauthorized operation prevention control unit 0106 to perform the data protection setting so as to make a data area 1207 for the program C usable (step S1111).

Here, the program C 0107 requests the unauthorized operation prevention control unit 0106 to secure an area at addresses 3500-3599 as the data area such that the data area can be accessed only by the program C 0107.

As a result of this, data area management information T0701 is added to the data area management information table T0700 for the program C, and security requirement management information T1405 is added to the security requirement management information table T1400.

Next, the program C 0107 performs the data protection setting so as to share the data area 1203 with the program A 0102 (step S1112).

Here, the program C 0107 requests the unauthorized operation prevention control unit 0106 to secure an area at addresses 1600-1699 as the data area 1203, with a security requirement indicating that an output to a file is not available.

The unauthorized operation prevention control unit 0106 performs the data area sharing setting process 0604, in the same manner as the setting of the shared memory (step S1108).

The setting of the shared memory (step S1112) fails, as is different from the setting of the shared memory (step S1108).

This is because it is judged that the request is not authenticated (step S0633), during the data area sharing setting process 0604.

More specifically, the unauthorized operation prevention control unit 0106 checks whether or not the function flag included in the program management information T1303 satisfies the security requirement included in the security requirement management information T1403.

In the present example, the security requirement indicates that the file output is not available, while the function flag indicates that the output is available. Accordingly, the unauthorized operation prevention control unit 0106 judges that the program C does not satisfy the security requirement of the data area 1203 (NO in step S0633), and the unauthorized operation prevention control unit 0106 ends the unauthorized operation prevention control process.

6. Modification

Up to now, the present invention has been described through an embodiment thereof. However, the present invention is not limited to the embodiment, but includes, for example, the following modifications.

(1) In Embodiment 1, the encryption key such as the code encryption key 0710 is encrypted with a public key encryption algorithm. However, the encryption method is not limited to this.

Each code encryption key may be encrypted by the common key encryption method. In this case, the common key used in the encryption is held by the unauthorized operation prevention control unit 0106. Programs may not necessarily be encrypted. In this case, the code encryption key 0710 is treated as a NULL key. Alternately, the code encryption key 0710 may include algorithm information used in encrypting the code 0711 for the program A.

The data encryption key 0702 may be encrypted by the common key encryption method, as well. In this case, the common key used in the encryption is held by the unauthorized operation prevention control unit 0106.

Further, when the data 0701 is not encrypted, the data encryption key 0702 is treated as a NULL key.

The data encryption key 0702 may include the algorithm information that is used in encrypting the data 0701.

(2) In the above-described embodiment, the unauthorized operation prevention circuit 0105 is used to restrict accesses to the RAM 0202. However, not limited to this, other circuits, methods or the like may be used to restrict accesses to the RAM 0202 in units of programs.

Figure 22:
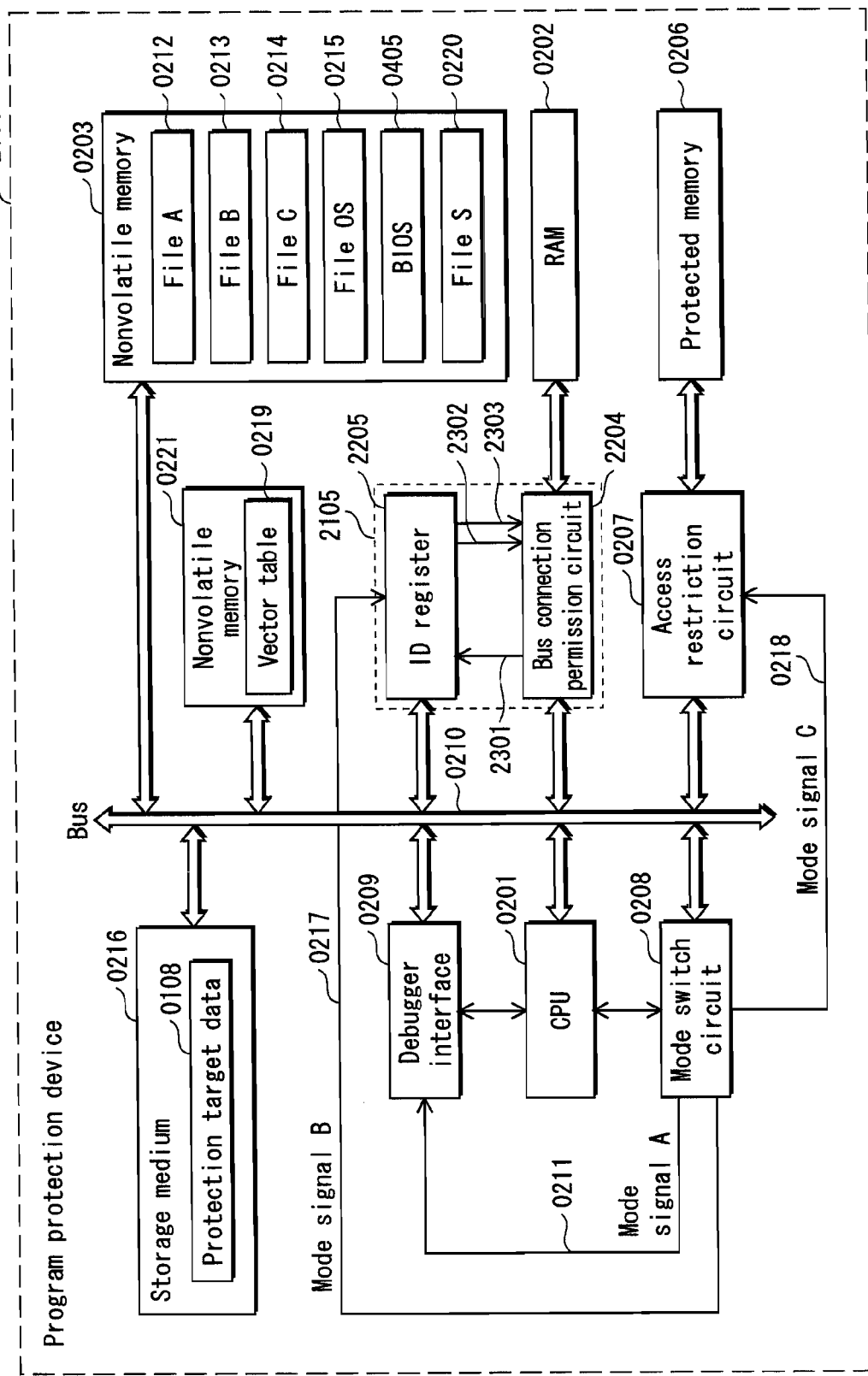
FIG. 22 is a block diagram showing the structure of a program protection device in a modification.

For example, an unauthorized operation prevention circuit 2105 may be used instead of the unauthorized operation prevention circuit 0105, as shown in FIG. 22.

The unauthorized operation prevention circuit 2105 restricts the accesses to the RAM 0202 using program IDs, instead of encrypting or decrypting the code or data to be stored into the RAM 0202.

The unauthorized operation prevention circuit 2105 is provided with an ID register 2205 instead of the key register, and a bus connection permission circuit 2204 instead of the bus encryption circuit.

Figure 23:
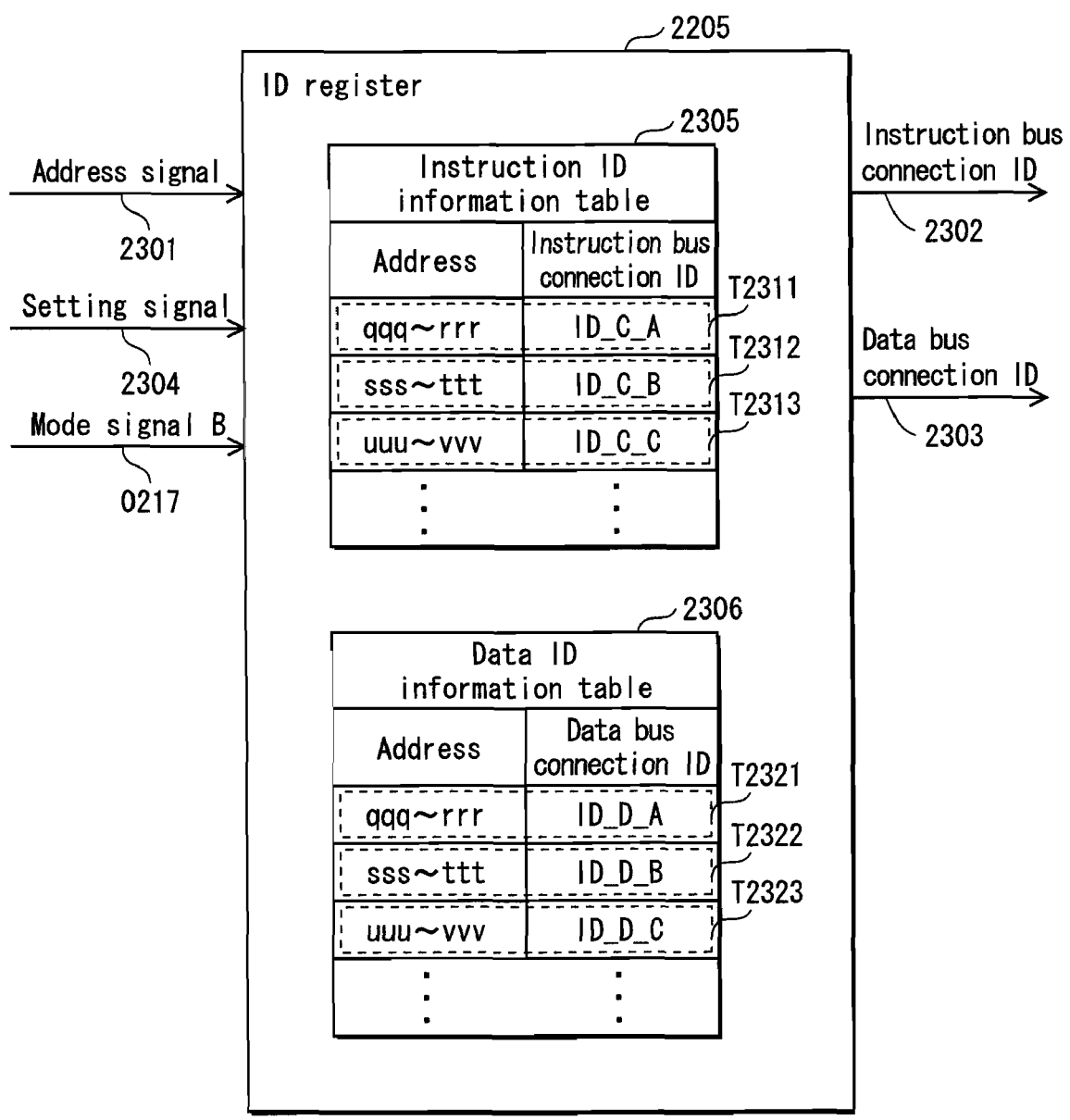
FIG. 23 shows the structure of the ID register in a modification.

The ID register 2205, as shown in FIG. 23, includes an instruction ID information table 2305, which indicates correspondence between an address and an instruction bus connection ID, and a data ID information table 2306 which indicates correspondence between an address and a data bus connection ID. The ID register 2205 obtains the address signal 2301 from a bus connection permission circuit 2204, and outputs an instruction bus connection ID 2302 and a data bus connection ID 2303, which correspond to an address indicated by an address signal 2301, to the bus connection permission circuit 2204.

Here, the instruction ID information table 2305 includes instruction ID information T2311, T2312, T2313, . . . . Each piece of instruction ID information indicates correspondence between an address and an instruction bus connection ID encryption key. The data ID information table 2306 includes data ID information T2321, T2322, T2323, . . . . Each piece of data ID information indicates correspondence between an address and a data bus connection ID.

With this change, the management table 0110 managed by the unauthorized operation prevention control unit 0106 contains, instead of the contents described in Embodiment 1, information regarding IDs to be set in the unauthorized operation prevention circuit 2105.

Further, the setting of the ID register 2205 can be changed using the setting signal 2304 notified from the bus 0210, only if the mode signal B, which is output from the mode switch circuit 0208, indicates the protected mode.

The RAM 0202 is a memory device connected to the bus connection permission circuit 2204.

The bus connection permission circuit 2204 compares a data bus connection ID and a code bus connection ID notified from the ID register 2205, with an ID unique to the currently operating program. If the IDs match each other, the bus connection permission circuit 2204 permits an access to a memory area identified by the address. The above-mentioned ID unique to the currently operating program is an ID unique to the current program that is set in the current program management table T0503.

This structure makes it possible for the bus connection permission circuit 2204 to control whether to transfer code or data between the bus 0210 and the RAM 0202.

Further, the bus connection permission circuit 2204 may detect whether the program operating on the CPU 0201 is accessing the RAM 0202 to fetch an instruction or to access the data, and use an instruction bus connection ID to fetch an instruction from the same physical address, and use a data bus connection ID to access the data.

(3) In the above-described embodiment, the management of information and changing of unit of execution, such as the code area, data area, security requirement, program management information, and memory sharing, are performed in units of programs. However, not limited to this, they may be performed in other units such as processes or threads. In this case, the processes or threads that operate in cooperation with each other in each of the normal mode and the protected mode may be other processes or other threads in the same program, not processes or threads included in different programs.

(4) Each of the above-described devices is specifically a computer system that includes a microprocessor, ROM, RAM, a hard disk unit, a display unit, a keyboard, a mouse, and the like. A computer program is stored in the RAM or the hard disk unit. The microprocessor operates in accordance with the computer program and causes each device to achieve the functions. Here, the computer program is a combination of a plurality of instruction codes indicating instructions to a computer.

(5) Part or all of constituent elements constituting each of the above-described devices may be achieved in a system LSI (Large Scale Integration). The system LSI is an ultra multi-functional LSI that is manufactured by integrating a plurality of components on one chip. More specifically, the system LSI is a computer system that includes a microprocessor, ROM, and RAM. A computer program is stored in the RAM. The microprocessor operates in accordance with the computer program, thereby enabling the system LSI to achieve its functions.

It should be noted here that although the term LSI is used here, it may be called IC, system LSI, super LSI, ultra LSI or the like, depending on the level of integration.

Also, the integrated circuit may not necessarily be achieved by the LSI, but may be achieved by the dedicated circuit or the general-purpose processor. It is also possible to use the FPGA (Field Programmable Gate Array), with which a programming is available after the LSI is manufactured, or the reconfigurable processor that can re-configure the connection or setting of the circuit cells within the LSI.

Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

(6) Part or all of the structural elements constituting each of the above-described devices may be achieved as an IC card or a single module that is attachable/detachable to or from each device. The IC card or module is a computer system that includes a microprocessor, ROM, RAM, and the like. The IC card or module may include the aforesaid ultra multi-functional LSI. The microprocessor operates in accordance with the computer program and causes the IC card or module to achieve the functions. The IC card or module may be tamper resistant.

(7) The present invention may be methods shown by the above. The present invention may be a computer program that allows a computer to realize the methods, or may be digital signals representing the computer program.

Furthermore, the present invention may be a computer-readable recording medium such as a flexible disk, a hard disk, CD-ROM, MO, DVD, DVD-ROM, DVD RAM, BD (Blu-ray Disc), or a semiconductor memory, that stores the computer program or the digital signal. Furthermore, the present invention may be the computer program or the digital signal recorded on any of the aforementioned recording medium apparatuses.

Furthermore, the present invention may be the computer program or the digital signal transmitted via an electric communication line, a wireless or wired communication line, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal via the recording medium, or by transferring the program or the digital signal via the network or the like, the program or the digital signal may be executed by another independent computer system.

(8) The present invention may be any combination of the above-described embodiments and modifications.

7. Supplementary Notes on Terminology

The data processing device corresponds to the program protection device 0101.

The detection unit corresponds to the CPU 0201 and the mode switch circuit 0208.

The access unit corresponds to the unauthorized operation prevention circuit 0105, the RAM 0202, the protected memory 0206, and the access restriction circuit 0207.

The switch unit corresponds to the mode switch circuit 0208.

The judgment unit corresponds to the unauthorized operation prevention control unit 0106.

The control unit corresponds to the unauthorized operation prevention control unit 0106 and the security kernel 0401.

The memory corresponds to the RAM 0202.

The holding sub-unit corresponds to the key register 0205.

The access restriction sub-unit corresponds to the unauthorized operation prevention control unit 0106, the security kernel 0401, the unauthorized operation prevention circuit 0105, the RAM 0202, the protected memory 0206, and the access restriction circuit 0207.

The obtaining further sub-unit included in the access restriction sub-unit corresponds to the RAM 0202, the key register 0205, the security kernel 0401, and the unauthorized operation prevention control unit 0106.

The address judgment further sub-unit corresponds to the key register 0205 and the bus encryption circuit 0204.

The access execution further sub-unit corresponds to the bus encryption circuit 0204.

The management information adding sub-unit corresponds to the unauthorized operation prevention control unit 0106.

The vector table holding unit corresponds to the nonvolatile memory 221.

The vector table rewriting unit corresponds to the unauthorized operation prevention control unit 0106.

The use request receiving sub-unit corresponds to the bus encryption circuit 0204.

The use judgment sub-unit corresponds to the bus encryption circuit 0204.

The authority judgment sub-unit corresponds to the unauthorized operation prevention control unit 0106.

The management information registration sub-unit corresponds to the unauthorized operation prevention control unit 0106.

The debug unit debug corresponds to the debugger interface 0209.

The forcibly invalidating unit corresponds to the CPU 0201.

INDUSTRIAL APPLICABILITY

The program protection device of the present invention is used as a digital home electric appliance for which the program can be updated to add a function, to correct a malfunction or the like, and is manufactured, used and sold by a person or entity who deals with home electric appliances or the like.

The invention claimed is:

1. A data processing device which has a processor that operates in accordance with a program, and operates by switching an operation mode between a normal mode and a protected mode, wherein, in the normal mode, a process being a unit of execution of the program runs, and in the protected mode, the process is restricted from running, the data processing device comprising:

an access prohibit unit operable to, in the normal mode, permit a first process to access process-target data of the first process, and prohibit another process from accessing the process-target data of the first process;
a detection unit operable to, in the normal mode, detect a call instruction from the first process to a second process;
a switch unit operable to, if the detection unit detects the call instruction, switch the operation mode from the normal mode to the protected mode;
a judgment unit operable to, in the protected mode, judge whether or not the second process is authorized to use the process-target data of the first process; and
a control unit operable to control the access prohibit unit to permit the second process to access the process-target data of the first process in the normal mode, when the judgment unit, in the protected mode, judges that the second process is authorized to use the process-target data of the first process.

2. The data processing device of claim 1, wherein
the access prohibit unit includes:
a memory;
a holding sub-unit holding management information such that the management information can be rewritten only in the protected mode, the management information indicating, for each process, an area in the memory that is permitted to be accessed; and
an access restriction sub-unit operable to cause a process, which runs in the normal mode, to access the memory in accordance with the management information, wherein
the control unit adds, to management information for the second process, information indicating that an area, in which the process-target data of the first process is held in the memory, is permitted to be accessed, when the judgment unit judges that the second process is authorized to use the process-target data of the first process.

3. The data processing device of claim 2, wherein
the management information held by the holding sub-unit includes one or more pieces of information in each of which an address allocated in the memory and a key are associated,
the access restriction sub-unit includes:
an obtaining further sub-unit operable to obtain a memory access request that requests for accessing the memory and includes the address allocated in the memory;
an address judgment further sub-unit operable to judge whether or not the address included in the memory access request is included in the management information; and
an access execution further sub-unit operable to, if the address judgment further sub-unit judges that the address included in the memory access request is included in the management information, generate encrypted data by encrypting data using the key corresponding to the address and writes the encrypted data into an area at the address if the memory access request is a write request, and read encrypted data from the area at the address, generate decrypted data by decrypting the read encrypted data using the key corresponding to the address, and output the decrypted data if the memory access request is a read request.

4. The data processing device of claim 2, wherein
the data is code for a process.

5. The data processing device of claim 2, wherein
each process is uniquely assigned a process identifier,
the management information held by the holding sub-unit includes one or more pieces of information in each of which an address allocated in the memory and a process identifier of a process that is a source of the memory access request are associated, the access restriction sub-unit includes:
an obtaining further sub-unit operable to obtain a memory access request that requests for accessing the memory and includes the address allocated in the memory;
an address judgment further sub-unit operable to judge whether or not the management information includes a piece of information in which the address included in the memory access request and a process identifier of a process that is a source of the memory access request are associated; and
an access execution further sub-unit operable to, if the address judgment further sub-unit judges that the management information includes the piece of information, cause the process, which is the source of the memory access request, to access the address allocated in the memory.

6. The data processing device of claim 1, wherein
the data is assigned with security requirement information that indicates whether or not one or more data processing methods, with respect to each thereof, are permitted to be performed,
each process is assigned with function information that indicates whether or not the process itself can execute the one or more data processing methods, with respect to each thereof,
the call instruction includes process specification information that specify one of the one or more data processing methods,
the judgment unit judges that the second process is authorized to use the process-target data of the first process if the security requirement information indicates that the data processing method, which is specified by the process specification information, is permitted to be performed, and if function information for the second process indicates that the second process can execute the data processing method specified by the process specification information.

7. The data processing device of claim 1, wherein
the switch unit, when switching the operation mode from the normal mode to the protected mode, saves a context of a process that is running in the normal mode, into a memory, and
when switching the operation mode from the protected mode to the normal mode, restores a context of a process that is to run next in the normal mode, from the memory.

8. The data processing device of claim 7, wherein
the first process and the second process include either an interrupt process or an exception process that processes an interrupt or an exception if the interrupt or the exception occurs while any of the first process and the second process is running,
the data processing device further comprising:
a vector table holding unit holding a vector table such that the vector table can be rewritten only in the protected mode, the vector table indicating a process that is to be performed if an interrupt or an exception occurs; and
a vector table rewriting unit operable to rewrite, in the protected mode before a currently running process switches from the first process to the second process, the vector table to indicate that an interrupt process or an exception process for the second process is to be performed if an interrupt or an exception occurs in the normal mode.

9. The data processing device of claim 1, wherein the judgment unit includes:
a use request receiving sub-unit operable to receive, from a process, a use request for using an area at an address in the memory;
a use judgment sub-unit operable to judge whether or not the area at the address has been used;
an authority judgment sub-unit operable to, if the use judgment sub-unit judges that the area at the address has not been used, judge whether or not the process, from which the use request was received, is authorized to use data that the process requests to be stored in the area at the address; and
a management information registration sub-unit operable to register information, which permits an access to the area at the address, with management information for the process from which the use request was received, if the authority judgment sub-unit judges that the process is authorized to use the data.

10. The data processing device of claim 9, wherein if the authority judgment sub-unit judges that the process is authorized to use the data, the management information registration sub-unit generates a key and adds information, in which the address and the generated key are associated, to the management information for the process from which the use request was received, as the information for permitting an access to the area at the address.

11. The data processing device of claim 1 further comprising
a debug unit operable to perform debugging for the process, and
the switch unit further validates the debug unit when switching the operation mode from the protected mode to the normal mode, and invalidates the debug unit when switching the operation mode from the normal mode to the protected mode.

12. A data processing method for use in a data processing device which has a processor that operates in accordance with a program, and operates by switching an operation mode between a normal mode and a protected mode, wherein, in the normal mode, a process being a unit of execution of the program runs, and in the protected mode, the process is restricted from running, the data processing method comprising the steps of:
permitting, in the normal mode, a first process to access process-target data of the first process, and prohibiting another process from accessing the process-target data of the first process;
detecting, in the normal mode, a call instruction from the first process to a second process;
switching the operation mode from the normal mode to the protected mode, if the detection step detects the call instruction;
judging, in the protected mode, whether or not the second process is authorized to use the process-target data of the first process; and
controlling the access prohibit step to permit the second process to access the process-target data of the first process in the normal mode, when the judgment step, in the protected mode, judges that the second process is authorized to use the process-target data of the first process.

13. A recording medium storing a computer program for use in a data processing device which has a processor that operates in accordance with the program, and operates by switching an operation mode between a normal mode and a protected mode, wherein, in the normal mode, a process being a unit of execution of the program runs, and in the protected mode, the process is restricted from running, the computer program comprising the steps of:
permitting, in the normal mode, a first process to access process-target data of the first process, and prohibiting another process from accessing the process-target data of the first process;
detecting, in the normal mode, a call instruction from the first process to a second process;
switching the operation mode from the normal mode to the protected mode, if the detection step detects the call instruction;
judging, in the protected mode, whether or not the second process is authorized to use the process-target data of the first process; and
controlling the access prohibit step to permit the second process to access the process-target data of the first process in the normal mode, when the judgment step, in the protected mode, judges that the second process is authorized to use the process-target data of the first process.

14. An integrated circuit which has a processor that operates in accordance with a program, and operates by switching an operation mode between a normal mode and a protected mode, wherein, in the normal mode, a process being a unit of execution of the program runs, and in the protected mode, the process is restricted from running, the integrated circuit comprising:
an access prohibit unit operable to, in the normal mode, permit a first process to access process-target data of the first process, and prohibit another process from accessing the process-target data of the first process;
a detection unit operable to, in the normal mode, detect a call instruction from the first process to a second process;
a switch unit operable to, if the detection unit detects the call instruction, switch the operation mode from the normal mode to the protected mode;
a judgment unit operable to, in the protected mode, judge whether or not the second process is authorized to use the process-target data of the first process; and
a control unit operable to control the access prohibit unit to permit the second process to access the process-target data of the first process in the normal mode, when the judgment unit, in the protected mode, judges that the second process is authorized to use the process-target data of the first process.

* * * * *